United States Patent [19]
Inada et al.

[11] Patent Number: 6,166,746
[45] Date of Patent: Dec. 26, 2000

[54] THREE-DIMENSIONAL IMAGE PROCESSING APPARATUS FOR JOINTED OBJECTS

[75] Inventors: Kazuhiko Inada, Kadoma; Masamichi Nakagawa, Hirakata; Fumio Maehara, Moriguchi, all of Japan

[73] Assignee: Matsushita Electric Industrial Co., Ltd., Osaka, Japan

[21] Appl. No.: 08/505,607

[22] Filed: Jul. 21, 1995

[30] Foreign Application Priority Data

Jul. 21, 1994 [JP] Japan .................................. 6-169392
Jul. 12, 1995 [JP] Japan .................................. 7-176177

[51] Int. Cl.$^7$ ................................................ G06T 15/70
[52] U.S. Cl. ........................................ 345/474; 345/473
[58] Field of Search ......................... 395/118–120, 173; 345/418–420, 435, 473–5

[56] References Cited

U.S. PATENT DOCUMENTS

| | | | |
|---|---|---|---|
| 4,600,919 | 7/1986 | Stern | 395/173 |
| 5,483,630 | 1/1996 | Unuma et al. | 345/475 |

FOREIGN PATENT DOCUMENTS 4-71078  3/1992  Japan .

OTHER PUBLICATIONS

Yamamoto, et al, "Human Motion Analysis Based on A Robot Arm Model", *IEEE*, 1991, pp. 664–665.
Hogg, "Model Based Vision: A Program to See a Walking Person", *Image and Vision Computing*, Feb., 1983, vol. 1, No. 1, pp. 5–20.
Mortawetz, Goal Directed Human Animation of Multiple Movements, *Graphics Interface*, pp. 60–67, May 14, 1990.
Badler, "Computer Animation Techniques", Conference Paper, Knowledge Based Systems International Conference, Oct. 20–21, 1987.

*Primary Examiner*—Mark Zimmerman
*Assistant Examiner*—Philip H. Stevenson
*Attorney, Agent, or Firm*—Ratner & Prestia

[57] ABSTRACT

An image processing apparatus has a three-dimensional joint position storing circuit for storing a three-dimensional coordinate position for each of available joints of an object at each frame for a standard action; a geometric data storing circuit for storing geometric data for at least a portion of the object based on unique coordinate systems for each of the available joints; a unique coordinate system determining circuit for determining the unique coordinate system for each of the available joints based on the stored three-dimensional coordinate positions; a three-dimensional joint angle computing circuit for computing a three-dimensional joint angle for at least one of the available joints based on a desired mode of action modification and the determined unique coordinate systems; a joint angle displacing circuit for displacing the three-dimensional joint angle for at least one of the available joints; a unique coordinate system generating circuit for generating the unique coordinate system for at least one of the available joints; and an action synthesizing circuit for assigning the geometric data corresponding to each of the available joints.

17 Claims, 26 Drawing Sheets

ADDITIONAL ACTION
INVERSE KINEMATICS $$\delta\Theta = (J^t J)^{-1} J \, \delta r$$

BASIC ACTION (WALKING)
IDCT $$\theta_n = \frac{z_0}{\sqrt{2}} + \sum_{k=1}^{M-1} a\, z_k \cos \frac{\pi\,(2nb+1)\,k}{2N}$$

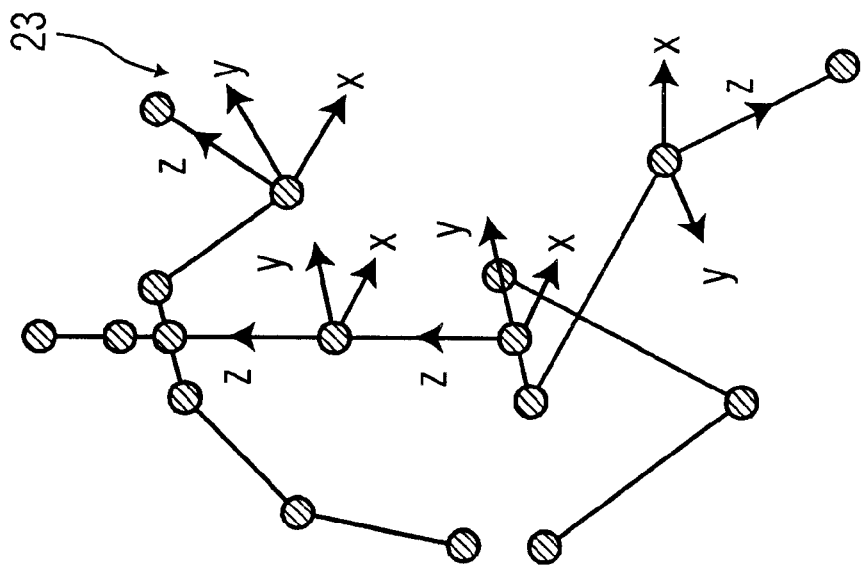
FIG. 2(b)
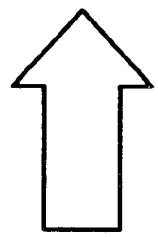
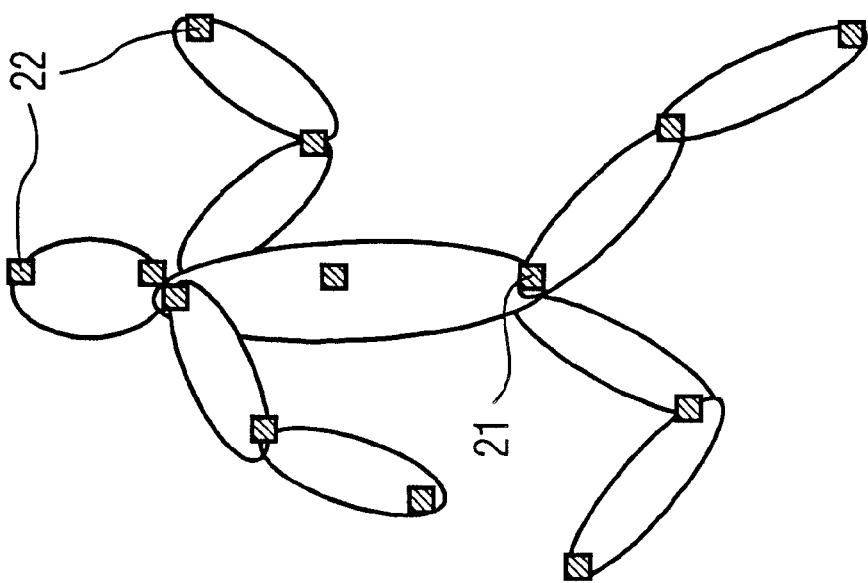
FIG. 2(a)

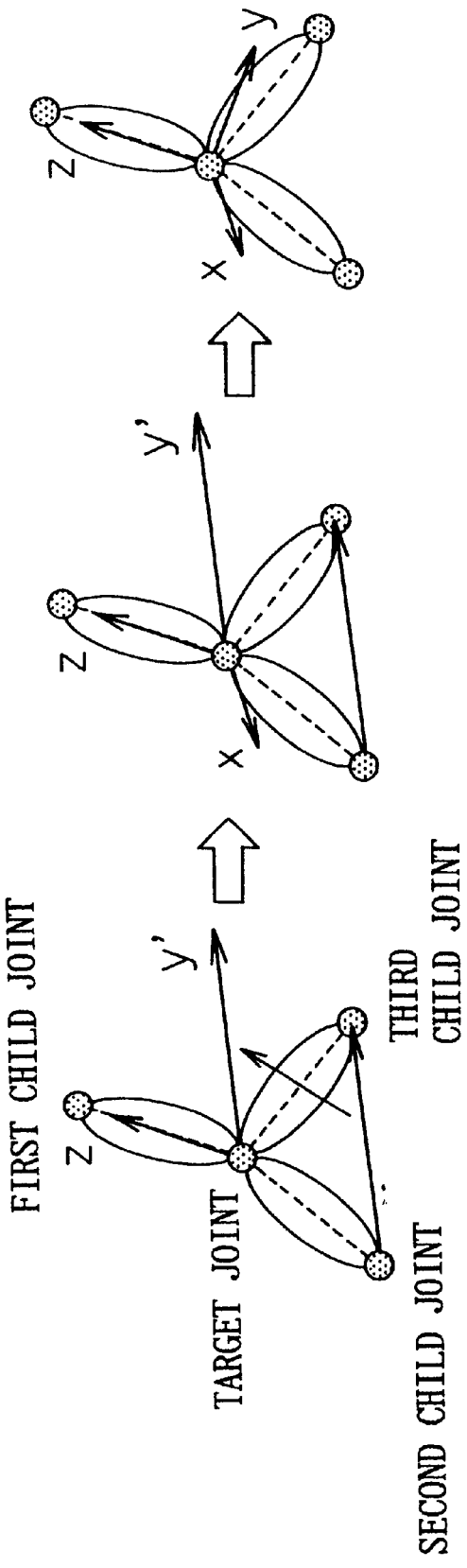

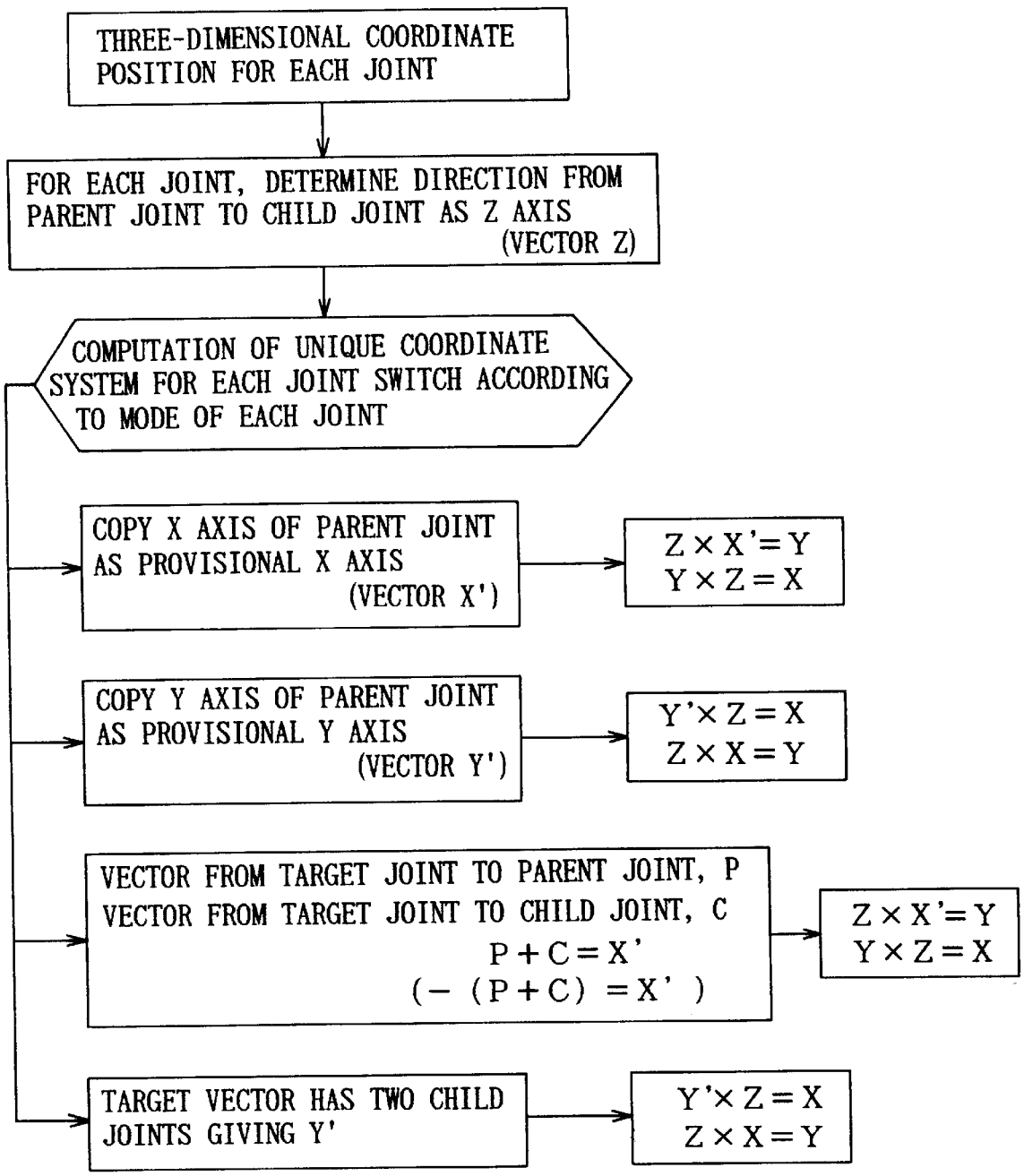

ROTATION OF X AXIS

ROTATION OF Y AXIS

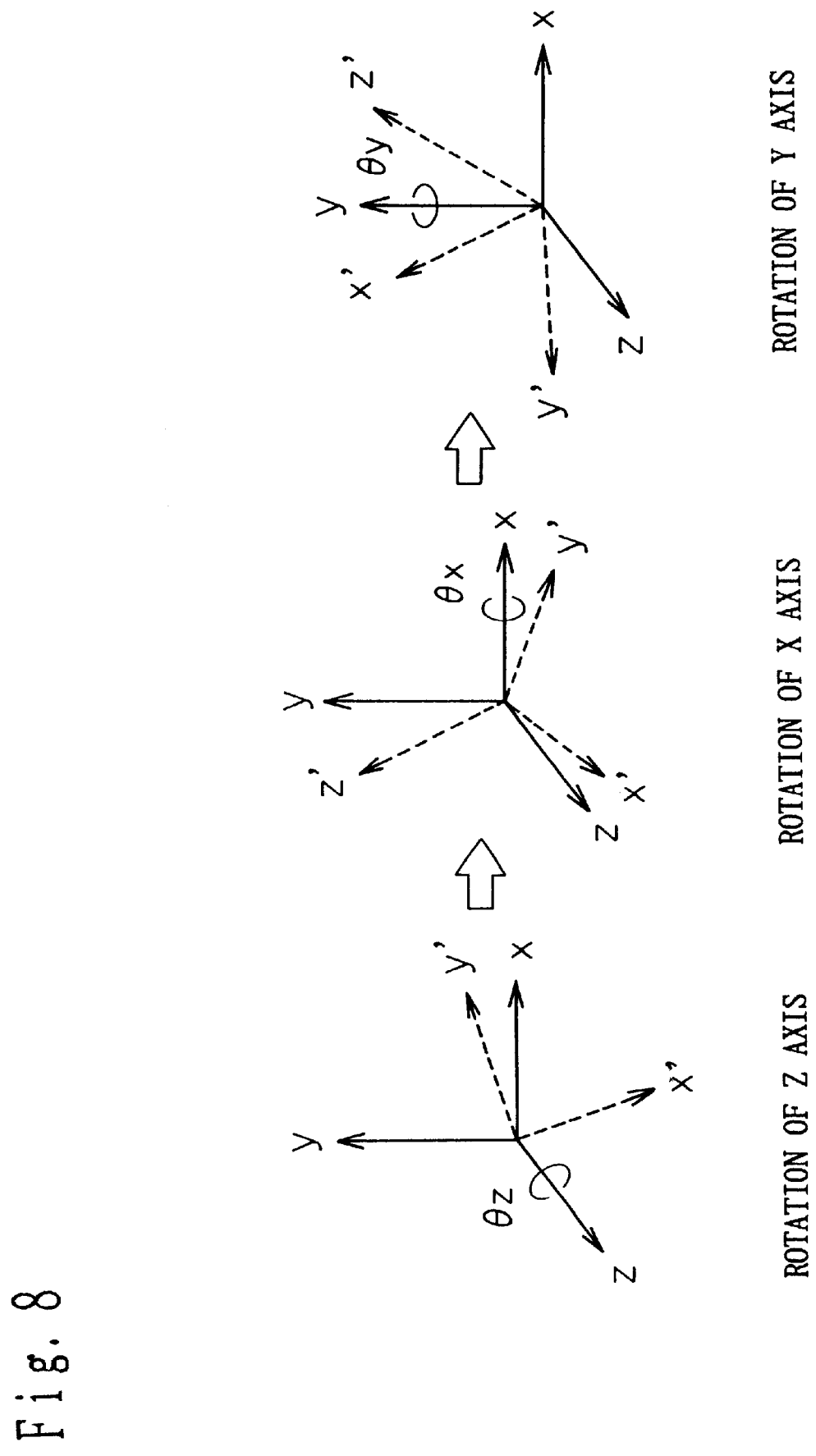

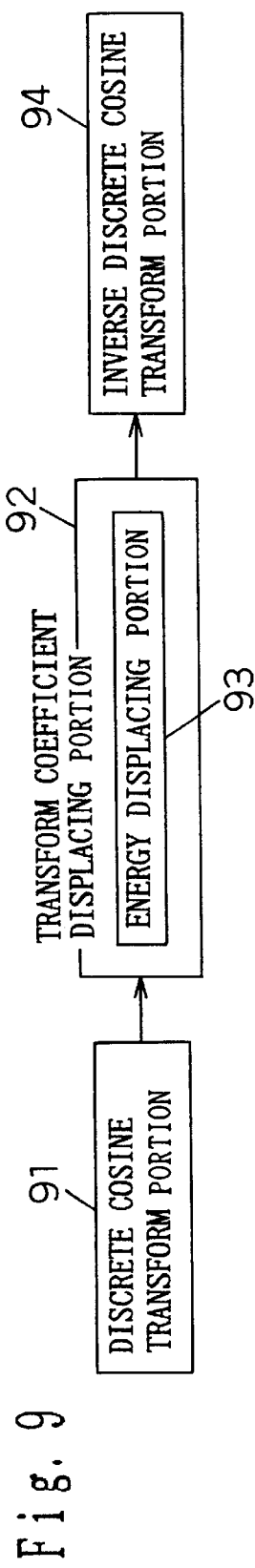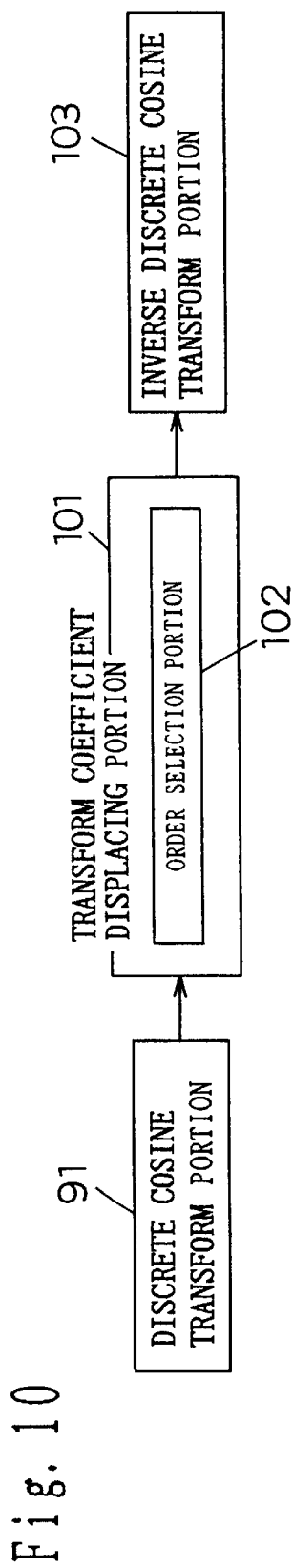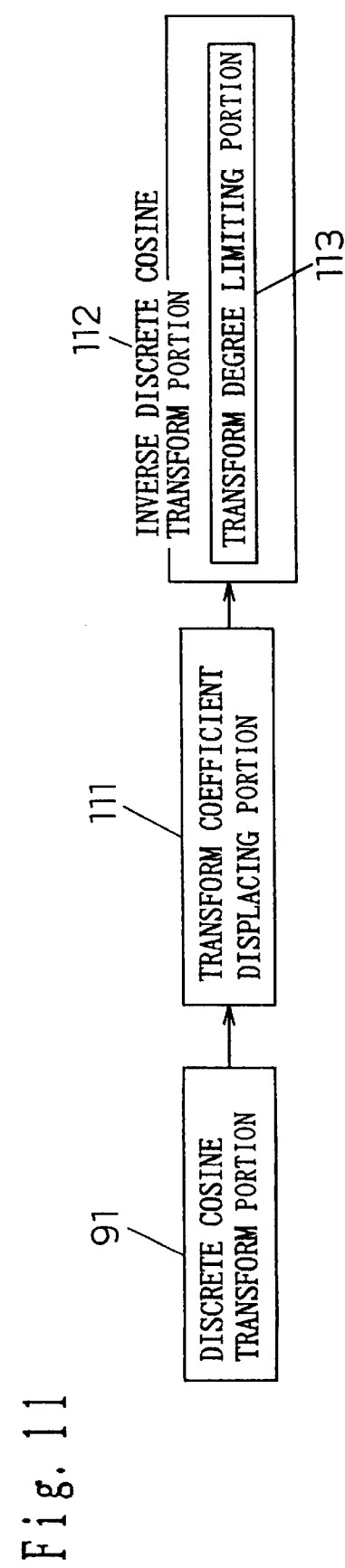

Fig. 17

| FRAME | JOINT1 | | | JOINT2 | | | JOINT3 |
|---|---|---|---|---|---|---|---|
| | X-AXIS | Y-AXIS | Z-AXIS | X-AXIS | Y-AXIS | Z-AXIS | .... |
| 1 | $\theta x11$ | $\theta y11$ | $\theta z11$ | $\theta x21$ | $\theta y21$ | $\theta z21$ | ⋮ |
| 2 | $\theta x12$ | $\theta y12$ | $\theta z12$ | $\theta x22$ | $\theta y22$ | $\theta z22$ | ⋮ |
| 3 | $\theta x13$ | $\theta y13$ | $\theta z13$ | $\theta x23$ | $\theta y23$ | $\theta z23$ | ⋮ |
| 4 | $\theta x14$ | $\theta y14$ | $\theta z14$ | $\theta x24$ | $\theta y24$ | $\theta z24$ | ⋮ |
| 5 | $\theta x15$ | $\theta y15$ | $\theta z15$ | $\theta x25$ | $\theta y25$ | $\theta z25$ | ⋮ |
| ⋮ | ⋮ | ⋮ | ⋮ | ⋮ | ⋮ | ⋮ | ⋮ |

BASIC ACTION FOR "WALKING"

| DEGREE OF DCT | JOINT1 | | | JOINT2 | | | JOINT3 |
|---|---|---|---|---|---|---|---|
| | X-AXIS | Y-AXIS | Z-AXIS | X-AXIS | Y-AXIS | Z-AXIS | |
| 0 | $z_{x10}$ | $z_{y10}$ | $z_{z10}$ | $z_{x20}$ | $z_{y20}$ | $z_{z20}$ | ⋮ |
| 1 | $z_{x11}$ | $z_{y11}$ | $z_{z11}$ | $z_{x21}$ | $z_{y21}$ | $z_{z21}$ | ⋮ |
| 2 | $z_{x12}$ | $z_{y12}$ | $z_{z12}$ | $z_{x22}$ | $z_{y22}$ | $z_{z22}$ | ⋮ |
| 3 | $z_{x13}$ | $z_{y13}$ | $z_{z13}$ | $z_{x23}$ | $z_{y23}$ | $z_{z23}$ | ⋮ |
| 4 | $z_{x14}$ | $z_{y14}$ | $z_{z14}$ | $z_{x24}$ | $z_{y24}$ | $z_{z24}$ | ⋮ |
| 5 | $z_{x15}$ | $z_{y15}$ | $z_{z15}$ | $z_{x25}$ | $z_{y25}$ | $z_{z25}$ | ⋮ |
| ⋮ | ⋮ | ⋮ | ⋮ | ⋮ | ⋮ | ⋮ | ⋮ |
| n | $z_{x1n}$ | $z_{y1n}$ | $z_{z1n}$ | $z_{x2n}$ | $z_{y2n}$ | $z_{z2n}$ | |

BASIC ACTION STORING SECTION

Fig. 19
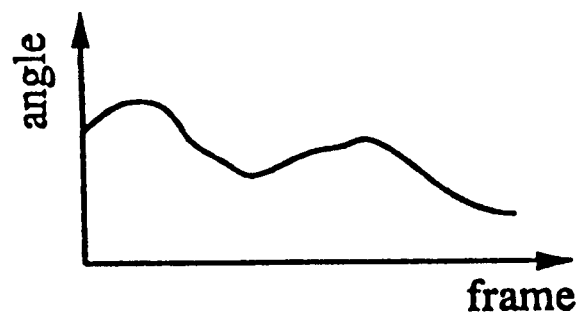
DCT
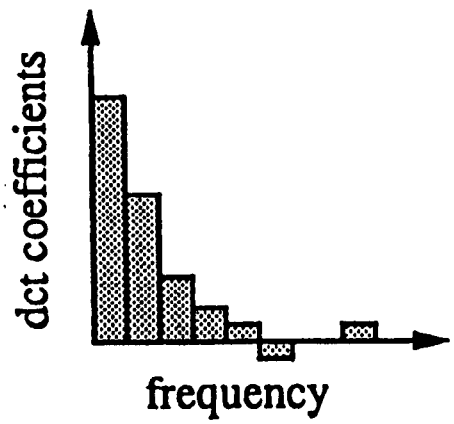
IDCT parameter
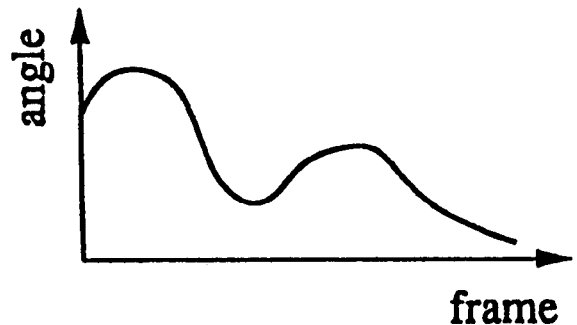

Fig. 22
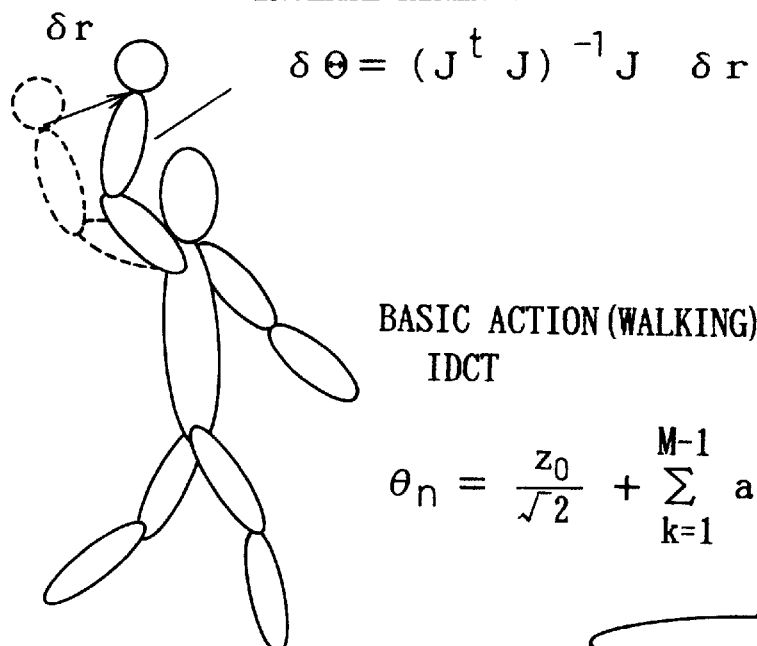
ADDITIONAL ACTION
INVERSE KINEMATICS
$$\delta\Theta = (J^t J)^{-1} J \ \delta r$$
BASIC ACTION (WALKING)
IDCT
$$\theta_n = \frac{z_0}{\sqrt{2}} + \sum_{k=1}^{M-1} a \ z_k \cos\frac{\pi(2nb+1)k}{2N}$$
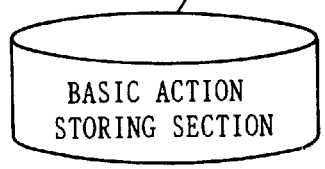
BASIC ACTION
STORING SECTION

THREE-DIMENSIONAL IMAGE PROCESSING APPARATUS FOR JOINTED OBJECTS

BACKGROUND OF THE INVENTION

1. Field of the Invention

The present invention relates to an image processing apparatus that can represent natural movements of an object having a plurality of joints in a simple manner.

2. Description of the Prior Art

When rendering movements of a human by computer graphics, image processing based on a key frame method or motion dynamics is usually performed. The key frame method is a method for expressing a motion using critical frames and their interpolated data, but it takes considerable time to determine the motion using the key frames. On the other hand, the method based on motion dynamics is capable of providing a fairly natural representation of movements, but the computation time required for processing by a computer is enormous.

In view of this situation, a method capable of simplifying the image processing is proposed in "A Method of Expressing Movements of a Multiarticular Object and A Computer Graphics Apparatus for Implementing the Same," (Japanese Patent Examined Publication No.4-71078). This method measures the movement of a multiarticular object (a human being) and attempts to express the movement by a one-dimensional joint angle function.

In this prior art, however, since the joint angle is expressed in one dimension, movements can be expressed only in a two-dimensional plane; furthermore, since no consideration is given to the orientation of a part between joints, motions such as twisting cannot be presented.

The above prior art also achieves reductions in processing time and data amount by expressing one-dimensional joint angles in the form of a function by using a prescribed function. The prior art, however, has had the problem that it cannot present movements responsive to the situation, for example, the movements of a human being trying to catch a ball with a hand.

SUMMARY OF THE INVENTION

It is accordingly an object of the present invention to provide an image processing apparatus that can synthesize an image in a standard action in a simple way by using a unique coordinate system in which an applicable part of an object having a plurality of joints can be uniquely placed between a set of adjacent available joints and which can take into account the orientation of the object in a certain direction.

It is a further object of the present invention to provide an image processing apparatus that can represent motions such as twisting and rotation by using three-dimensional joint angles for available joints.

It is still a further object of the present invention to provide an image processing apparatus that easily generates data on various action modifications by using unique coordinate systems and three-dimensional joint angles for available joints.

It is another object of the present invention to provide an image processing apparatus that can add different actions that match different situations, to a basic action represented by using unique coordinate systems and three-dimensional joint angles for available joints.

To achieve the above objects, the invention provides an image processing apparatus which has a three-dimensional joint position storing circuit for storing a three-dimensional coordinate position for each of the available joints of an object at each frame for a standard action of the object. A geometric data storing circuit stores geometric data for a portion of the object with respect to a plurality of unique coordinate systems for each of the available joints. The unique coordinate system for each of the available joints is determined by a unique coordinate system determining circuit on the basis of the stored three-dimensional coordinate positions and a three-dimensional joint angle for at least some of the available joints are computed by a three-dimensional joint angle circuit in accordance with a desired mode of action modification on the basis of the determined unique coordinate systems. The three-dimensional joint angle for at least some of the available joints are displaced by a joint angle displacing circuit in accordance with the desired mode of action modification on the basis of the computed three-dimensional joint angles. The unique coordinate system for the available joints is generated using a unique coordinate system generating circuit in accordance with the desired mode of action modification on the basis of the computed and/or displaced three-dimensional joint angles and geometric data for each of the available joints is assigned by an action synthesizer in accordance with the mode of action modification on the basis of the determined and/or generated unique coordinate systems.

Further, to achieve the above objects, the invention also provides an image processing apparatus comprising: unique coordinate system storing means for storing a unique coordinate system for each of available joints of an object at each frame for a standard action; geometric data storing means for storing geometric data on parts of the object with respect to a plurality of unique coordinate systems for each of the available joints; three-dimensional joint angle computing means for computing a three-dimensional joint angle for each of all or part of the available joints in accordance with a desired mode of action modification and on the basis of the stored unique coordinate systems; joint angle displacing means for displacing the three-dimensional joint angle for each of all or part of the available joints in accordance with the desired mode of action modification and on the basis of the computed three-dimensional joint angles; unique coordinate system generating means for generating the unique coordinate system for each of all or part of the available joints in accordance with the desired mode of action modification and on the basis of the computed and/or displaced three-dimensional joint angles; action synthesizing means for assigning corresponding the geometric data to each of the available joints in accordance with the desired mode of action modification and on the basis of the stored and/or generated unique coordinate systems.

Furthermore, to achieve the above objects, the invention provides an image processing apparatus comprising: three-dimensional joint angle storing means for storing a three-dimensional joint angle for each of available joints of an object at each frame for a standard action; geometric data storing means for storing geometric data on parts of the object with respect to a plurality of unique coordinate systems for each of the available joints; unique coordinate system determining means for determining the unique coordinate system for each of the available joints on the basis of the unique coordinate system for a root joint and the stored three-dimensional joint angles; joint angle displacing means for displacing the three-dimensional joint angle for each of all or part of the available joints in accordance with a desired mode of action modification and on the basis of the stored three-dimensional joint angles; unique coordinate system generating means for generating the unique coordinate system for each of all or part of the available joints in accordance with the desired mode of action modification and on the basis of the stored and/or displaced three-dimensional joint angles; and action synthesizing means for assigning a corresponding the geometric data to each of the available joints in accordance with the desired mode of action modification and on the basis of the determined and/or generated unique coordinate systems.

Still furthermore, to achieve the above objects, the invention provides an image processing apparatus comprising: basic action storing means for storing a three-dimensional joint angle for each of all or part of the available joints of an object at each frame for a basic action; basic action selecting means for selecting a desired basic action from the basic action storing means; parameter setting means for setting an action modification parameter which becomes necessary when modifying the selected basic action into an action with a desired action modification; basic action modification generating means for modifying the selected basic action into the action with the desired action modification by using the action modification parameter; additional action selecting means for selecting a desired additional action which is added to the modified basic action; additional action generating means for generating the additional action on the basis of the modified basic action and the selected additional action; and action synthesizing means for combining the modified basic action with the generated additional action.

BRIEF DESCRIPTION OF THE DRAWINGS

These and other objects, advantages, features, and uses will become more apparent as the description proceeds, when considered with the accompanying drawings in which:

FIGS. 2(a)–(b) are diagrams schematically showing available joints when a human is running;

FIG. 3 is a diagram illustrating how a four-joint unique coordinate system is determined;

FIG. 6 is a flow chart illustrating procedures for determining the two-joint coordinate system, three-joint coordinate system, and four-joint coordinate system;

FIG. 8 is a diagram showing that when the unique coordinate system for a parent joint shown in FIG. 7 is rotated about its axes in the order of z, x, and y, the result of the rotation is the generation of a unique coordinate system for its child joint;

FIG. 9 is a block diagram of a joint angle displacing portion 14 for displacing a three-dimensional joint angle for each of joints in an energy displacement mode;

FIG. 10 is a block diagram of a joint angle displacing portion 14 for displacing a three-dimensional joint angle for each of joints in an order displacement mode;

FIG. 11 is a block diagram of a joint angle displacing portion 14 for displacing a three-dimensional joint angle for each of joints in an action speed displacement mode;

FIG. 17 is a diagram showing how the three-dimensional joint angle for each of available joints change in a time domain when the human skeleton model shown in FIG. 2(b) performs an action;

FIG. 19 is a diagram showing an example of how the energy after DCT is concentrated in the low-frequency components of the DCT coefficients;

FIG. 22 is a diagram showing an implementation of an action "walking"+"trying to catch a ball";

FIG. 23 is a flow chart illustrating the operation of the image processing apparatus of FIG. 16 equipped with an additional action generating section 167a;

DETAILED DESCRIPTION OF THE PREFERRED EMBODIMENTS

Figure 1:
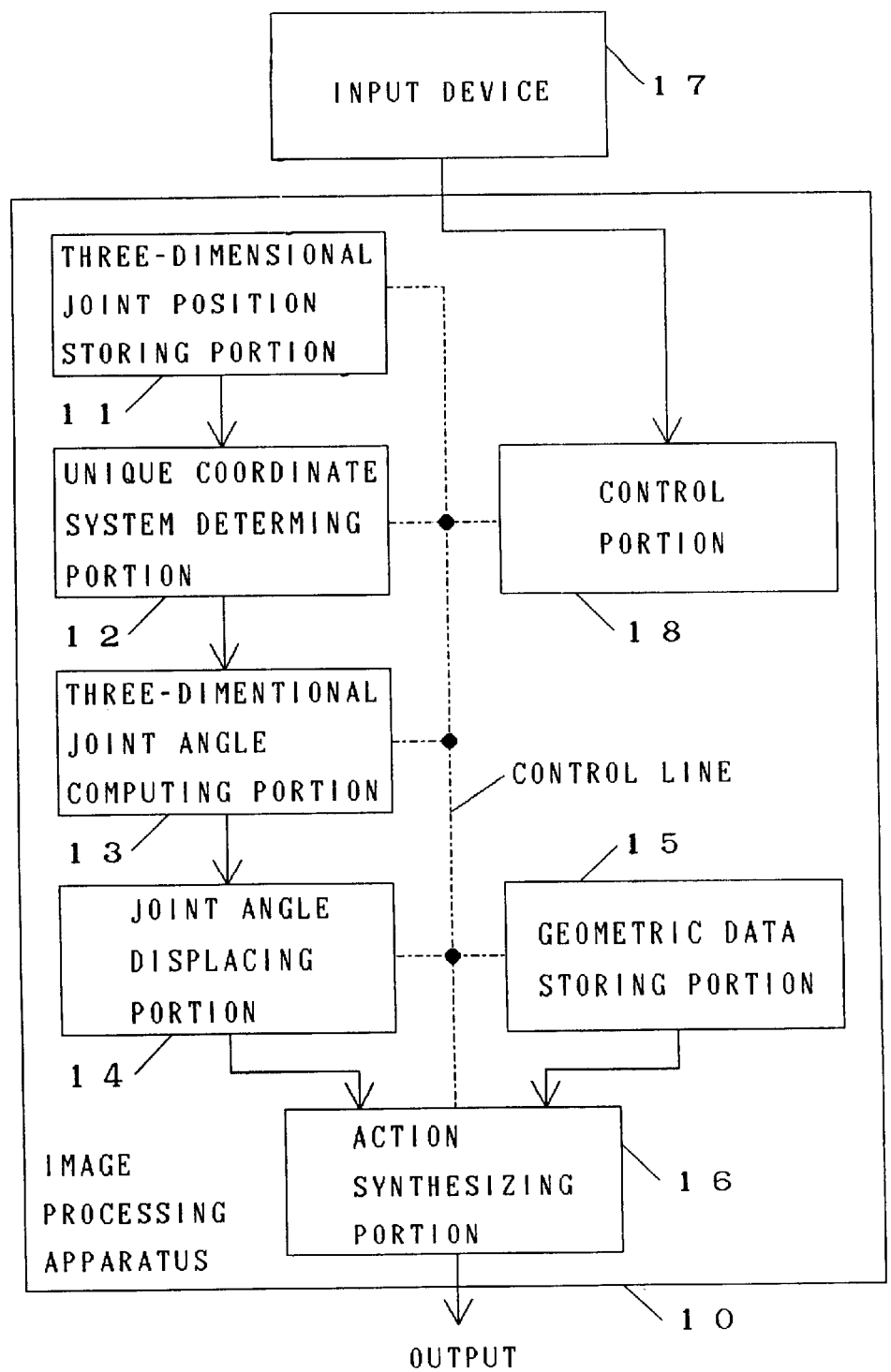
FIG. 1 is a block diagram of one embodiment of an image processing apparatus according to the present invention.

Referring now to FIG. 1, there is shown therein a block diagram of one embodiment of an image processing apparatus according to the first exemplary embodiment of the present invention. When a human performs a prescribed action, for example, a three-dimensional coordinate position for each of available joints is stored in a three-dimensional joint position storing portion 11 on a frame-by-frame basis for one cycle of the action. The prescribed action here refers to an action that can be represented by the repetition of one cycle of a particular action, for example, a repetitive action such as vertical jumping, walking, running, swimming the crawl, etc. The prescribed action is not specifically limited to these repetitive actions, but includes an action that completes in one cycle, such as a diving action at the start of a crawl-swimming race. The available joints mentioned here refer to the joints of the human that become necessary when synthesizing the prescribed action, and do not necessarily mean all the joints that the human has. The prescribed action stored in the three-dimensional joint position storing portion 11 is hereinafter referred to as the standard action. This storing portion may be contained in either an internal storage device or an external storage device to the image processing apparatus 10.

An input device 17 is a device that the operator uses to input instructions for a desired action. A control portion 18 performs control for image processing in accordance with the instructions input at the input device 17.

We will now describe a unique coordinate system and its associated devices. The unique coordinate system means a three-dimensional coordinate system unique to an available joint with its origin at the available joint. A characteristic of the unique coordinate system is that once a unique coordinate system for an available joint is obtained, associated parts of an object can be uniquely placed between the available joint and its adjacent available joints. In the present embodiment, the unique coordinate system for an available joint is so constructed that associated human parts are placed between the available joint and its child joints. Each part is so placed as to be oriented in the positive direction of the z-axis as viewed from the origin of the unique coordinate system for the available joint.

Another characteristic of the unique coordinate system is that once a unique coordinate system for an available joint is determined, the end point of the part associated with the available joint, opposite from the other end point thereof at the origin, becomes the origin of a unique coordinate system for its child joint. Methods of determining the unique coordinate system will be described in detail later. Now, a geometric data storing portion 15 stores geometric data on human parts with respect to a plurality of unique coordinate systems for each of the available joints. A unique coordinate system determining portion 12 determines a unique coordinate system for each of the available joints.

A three-dimensional joint angle and its associated devices will be described below. The three-dimensional joint angle for an available joint is the three-dimensional angle between the unique coordinate system for the available joint and a unique coordinate system for an available joint adjacent to it. In the present embodiment, the three-dimensional joint angle for an the available joint is the three-dimensional angle between the unique coordinate system for the available joint and a unique coordinate system for its parent joint. A characteristic of the three-dimensional joint angle is that using the three-dimensional joint angles, motions such as twisting and rotation can be expressed in a simple way. A further characteristic of the three-dimensional joint angle is that by displacing the three-dimensional joint angles, an action modifications can be easily made to the standard action. An action modification means modifying, for example, an action of walking at a normal pace into an action of walking with long strides or with short steps, or into an action of walking at a quick pace or at a slow pace, that is, modifying the standard action with a different action associated with it. A method of obtaining the three-dimensional joint angle will be described in detail later. Based on the unique coordinate systems determined by the unique coordinate system determining portion 12, and using the unique coordinate systems for an available joint and its child joint, a three-dimensional joint angle computing portion 13 computes a three-dimensional joint angle for each of the available joints in accordance with the desired mode of action modification. Based on the three-dimensional joint angles computed by the three-dimensional joint angle computing portion 13, a joint angle displacing portion 14 displaces a three-dimensional joint angle for each of the available joints in accordance with the mode of action modification. An action synthesizing portion 16 is equipped with a unique coordinate system generating portion (not shown). Based on the three-dimensional joint angles displaced by the joint angle displacing portion 14, the unique coordinate system generating portion generates a unique coordinate system for each of the available joints in accordance with the mode of action modification. Based on the unique coordinate systems generated by the unique coordinate system generating portion and/or the unique coordinate systems determined by the unique coordinate system determining portion 12, the action synthesizing portion 16 reads corresponding geometric data from the geometric data storing portion 15 and assigns the thus readout data to each of the available joints.

Here, a computation range that provides a range for the available joints for which the three-dimensional joint angle computing portion 13 computes three-dimensional joint angles, a displacement range that provides a range for the available joints for which the joint angle displacing portion 14 displaces the three-dimensional joint angles, and a generation range that provides a range for the available joints for which the unique coordinate system generating portion generates unique coordinate systems, are determined by the mode of action modification. For example, when applying a modification to a standard action representing a human rotating through 360 degrees, the situation may be considered where the computation range, displacement range, and generation range cover all the available joints. On the other hand, when applying a modification to a standard action describing a human moving only his right hand back and forth, the available joints to be considered are from the available joint near the right shoulder either to the fingertips or to the available joint at the hand. First, in a situation where the available joints up to the fingertips are to be considered, the computation range, displacement range, and generation range cover the same range, i.e., from the available joint near the right shoulder to the fingertips. These available joints, however, are not all the available joints. On the other hand, in a situation where the available joints up to the available joint at the hand are to be considered, the computation range and generation range are the same, i.e., from the available joint near the right shoulder to the fingertips, but the displacement range is from the available joint near the right shoulder to the available joint at the hand. Further, the computation range, displacement range, and generation range do not cover all the available joints.

Thus, the computation range, displacement range, and generation range are determined by the mode of action modification. These ranges may be made to always cover all the available joints, or may be determined appropriately in accordance with the mode of action. In short, the action synthesizing portion 16 should assign corresponding geometric data to each of the available joints in accordance with the mode of action modification and on the basis of the unique coordinate systems generated by the unique coordinate system generating portion and/or the unique coordinate systems determined by the unique coordinate system determining portion 12.

The wording "for each of all or part of said available joints" in the paragraph of "three-dimensional joint angle computing means", "joint angle displacing means" and "unique coordinate system generating means" in the first and second exemplary embodiment are related to the above description. In the third exemplary embodiment, the wording "for each of all or part of the available joints" in the paragraph of "joint angle displacing means" and "unique coordinate system generating means" is related to the above description.

The operation of the present embodiment will now be explained. FIGS. 2(a)–(b) are diagrams schematically showing the available joints when a human is running. When a root joint for the available joints is established, the parent-child relationship among the available joints is determined. In the example of FIG. 2, a waist joint 21 is set as the root joint. The operation of the present embodiment is classified into two modes, standard action mode and action modification mode, which will be described in sequence below.

(1) Standard action mode

The standard action mode is a mode in which a prescribed action is synthesized without applying modifications. More specifically, based on the three-dimensional positions stored in the three-dimensional joint position storing portion 11, the unique coordinate system determining portion 12 determines the unique coordinate systems for each of the available joints in the parent-child order starting from the root joint. In the standard action mode, the computation range, displacement range, and generation range, which are determined by the desired mode of action modification, cover all the available joints. Using the unique coordinate systems determined by the unique coordinate system determining portion 12, the three-dimensional joint angle computing portion 13 computes the three-dimensional joint angles for each of the available joints in the parent-child order starting from the root joint. In the standard action mode, the joint angle displacing portion 14 does not apply displacement to the three-dimensional joint angles computed by the three-dimensional joint angle computing portion 13. Using the unique coordinate system for the root joint and the three-dimensional joint angles supplied from the joint angle displacing portion 14, the unique coordinate system generating portion (not shown) provided in the action synthesizing portion 16 generates the unique coordinate system for each of the available joints. Using the unique coordinate systems generated by the unique coordinate system generating portion, the action synthesizing portion 16 assigns corresponding geometric data, stored in the geometric data storing portion 15, to each of the available joints in the parent-child order starting from the root joint.

The above processing is performed in frame sequence and repeated for the desired number of cycles, thereby producing a repetition of the prescribed action in the standard action mode.

In the standard action mode, the processing by the three-dimensional joint angle computing portion 13, the joint angle displacing portion 14, and the unique coordinate system generating portion may be omitted, and the action synthesizing portion 16 may be operated in such a manner that the unique coordinate system for each of the available joints is input to it from the unique coordinate system determining portion 12 and geometric data stored in the geometric data storing portion 15 is assigned to each available joint.

(2) Action modification mode

The action modification mode is a mode in which an action is synthesized by applying a modification to the standard action. More specifically, based on the three-dimensional coordinate positions stored in the three-dimensional joint position storing portion 11, the unique coordinate system determining portion 12 determines the unique coordinate system for each of the available joints in the parent-child order starting from the root joint. For simplicity, it is assumed here that the computation range, displacement range, and generation range, which are determined by the desired mode of action modification, cover all the available joints. Using the unique coordinate systems determined by the unique coordinate system determining portion 12, the three-dimensional joint angle computing portion 13 computes the three-dimensional joint angle for each of the available joints in the parent-child order starting from the root joint. Using a prescribed function for applying displacement in accordance with the mode of action modification, the joint angle displacing portion 14 displaces the three-dimensional joint angle for each of the available joints input from the three-dimensional joint angle computing portion 13. Using the unique coordinate system for the root joint and the three-dimensional joint angles supplied from the joint angle displacing portion 14, the unique coordinate system generating portion (not shown) provided in the action synthesizing portion 16 generates the unique coordinate system for each of the available joints. Using the unique coordinate systems generated by the unique coordinate system generating portion, the action synthesizing portion 16 assigns corresponding geometric data, stored in the geometric data storing portion 15, to each of the available joints in the parent-child order starting from the root joint.

The above processing is performed in frame sequence and repeated for the desired number of cycles, thereby producing a repetition of the prescribed action in the action modification mode.

Methods of determining the unique coordinate systems by the unique coordinate system determining portion 12 will now be explained in more detail. The following describes methods of determining the three kinds of unique coordinate systems used in the present embodiment.

(1) Method of determining four-joint unique coordinate system

Referring to FIG. 3, there is shown therein a diagram showing how a four-joint unique coordinate system is determined. This method is used, for example, to obtain a unique coordinate system for the available joint at the human waist or the like. In the example shown, the waist joint, the target joint for which the unique coordinate system is to be determined, is the root joint, and the other available joints are the first child joint, the second child joint, and the third child joint, as shown in FIG. 3. The unique coordinate system is determined in the following sequence.

1. A vector directed from the target joint to the first child joint is determined as the z axis.
2. A vector directed from the second child joint to the third child joint is copied to the target joint, and the copied vector is set as a provisional y' axis.
3. Outer product of the z axis and y' axis is determined as the x axis.
4. Outer product of the z axis and x axis is determined as the y axis.

(2) Method of determining three-joint unique coordinate system

Figure 4A:
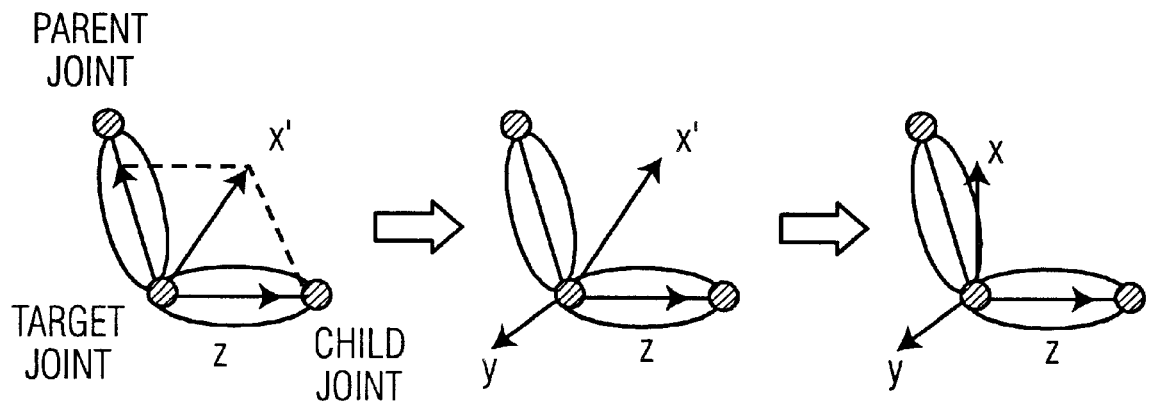
FIGS. 4(a)–(b) are diagrams illustrating how a three-joint unique coordinate system is determined.
Figure 4B:
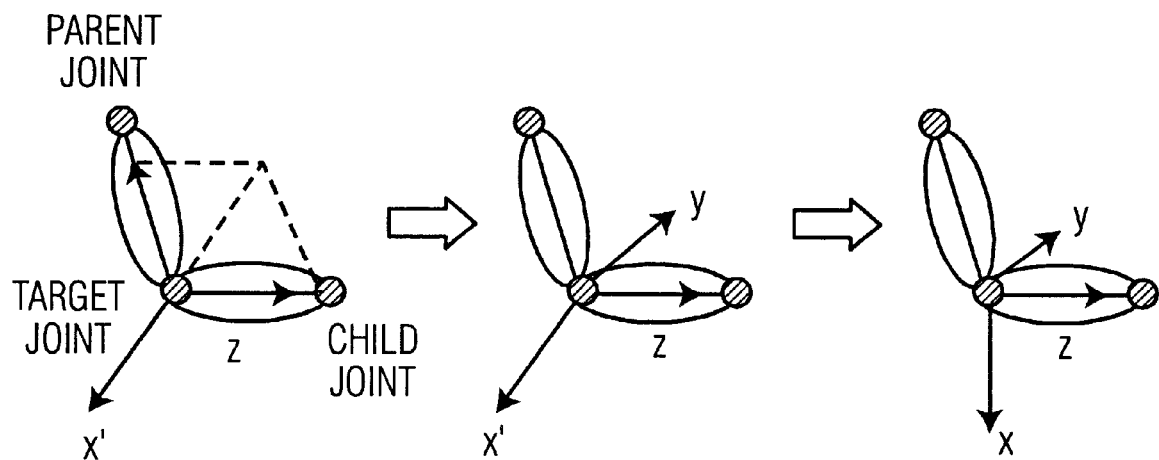

Referring to FIGS. 4(a)–(b) there is shown therein diagrams showing how a three-joint unique coordinate system is determined. Here, the available joint for which the unique coordinate system is to be determined is designated as the target joint, the available joint that acts as the parent of the target joint is designated as the parent joint (for which the unique coordinate system need not be determined yet), and the available joint that acts as a child of the target joint is designated as the child joint.

Referring to FIG. 4(a), there is shown therein a diagram showing how a unique coordinate system is determined for the available joint at a human elbow or the like. The unique coordinate system is determined in the following sequence.

1. A vector directed from the target joint to the child joint is determined as the z axis.
2. The resultant vector between the z axis and the vector directed from the target joint to the parent joint is set as a provisional x' axis.
3. Outer product of the z axis and the x' axis is determined as the y axis.
4. Outer product of the z axis and the y axis is determined as the x axis.

Referring to FIG. 4(b), there is shown therein a diagram showing how a unique coordinate system is determined for the available joint at a human knee or the like. The unique coordinate system is determined in the following sequence.

1. A vector directed from the target joint to the child joint is determined as the z axis.
2. The inverted vector of the resultant vector between the z axis and the vector directed from the target joint to the parent joint is set as a provisional x' axis.
3. Outer product of the z axis and the x' axis is determined as the y axis.
4. Outer product of the z axis and the y axis is determined as the x axis.

As is apparent from the above description, the three-joint unique coordinate system is suitable for obtaining a unique coordinate system for the available joint at a human elbow or knee, and has the characteristic that the front facing direction of the human can always be set along the positive x axis.

(3) Method of determining two-joint unique coordinate system

Figure 5A:
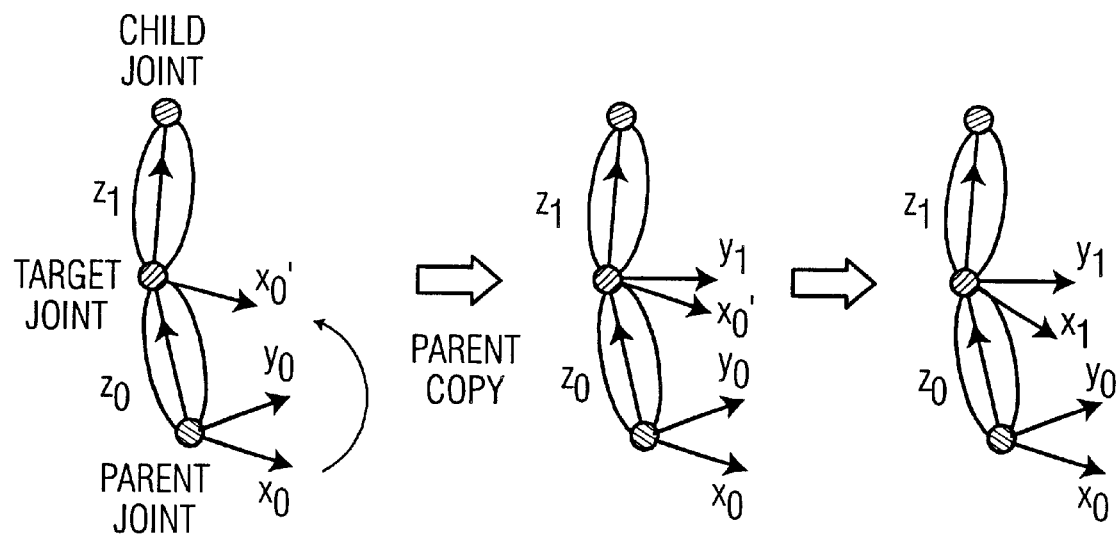
FIGS. 5(a)–(b) are diagrams illustrating how a two-joint unique coordinate system is determined.
Figure 5B:
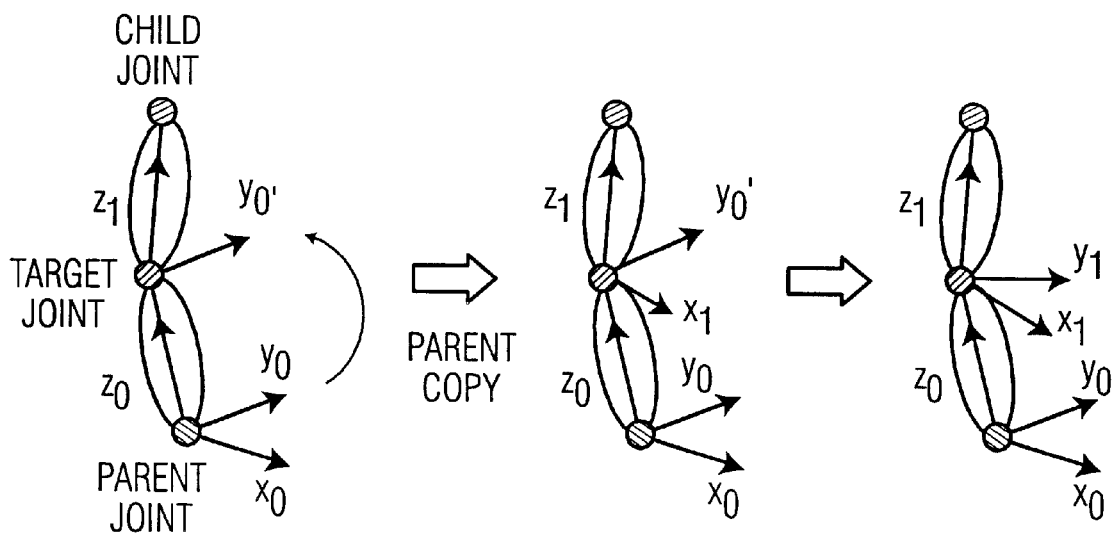

Referring to FIGS. 5(a)–(b), there is shown therein how a two-joint unique coordinate system is determined: part (a) is a diagram showing how the unique coordinate system for the target joint is determined by copying the x axis from the unique coordinate system for the parent, and part (b) is a diagram showing how the unique coordinate system for the target joint is determined by copying the y axis from the unique coordinate system for the parent. Here, the available joint for which the unique coordinate system is to be determined is designated as the target joint, the available joint that acts as the parent of the target joint is designated as the parent joint (for which the unique coordinate system is already determined), and the available joint that acts as a child of the target joint is designated as the child joint. The unique coordinate system is determined in the following sequence.

1. A vector directed from the target joint to the child joint is determined as the $z_1$ axis.
2. The $x_0$ axis (or the $y_0$ axis) of the parent joint is copied to the target joint, and the copied axis is set as a provisional $x_0'$ axis (or a provisional $y_0'$ axis).
3. Outer product of the $z_1$ axis and $x_0'$ axis (or $y_0'$ axis) is determined as the $y_1$ axis (or the $x_1$ axis).
4. Outer product of the $z_1$ axis and $y_1$ axis (or $x_1$ axis) is determined as the $x_1$ axis (or the $y_1$ axis).

A flow chart illustrating procedures for determining the three kinds of unique coordinate systems is shown in FIG. 6.

Unique coordinate systems for each of the available joints can thus be determined. With these unique coordinate systems, it is possible to construct coordinate systems for body parts such as the elbow and knee by taking into account the front and back orientation of a human body.

Figure 7A:
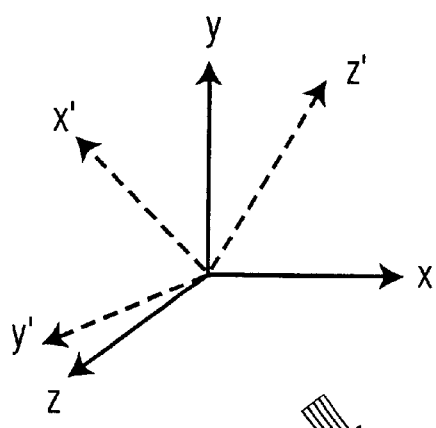
FIGS. 7(a)–(e) are diagrams illustrating how a three-dimensional joint angles are computed.

A method of determining a three-dimensional joint angle will now be explained in detail. Referring to FIGS. 7(a)–(e), there is shown therein how a three-dimensional joint angle is computed. FIG. 7(a) is a diagram showing a relationship in terms of the three-dimensional angle between a unique coordinate system (x, y, z) for an arbitrary joint and a unique coordinate system (x', y', z') for a joint adjacent to the arbitrary joint. An example of a procedure for computing the three-dimensional joint angle for the arbitrary joint will be described below with reference to FIGS. 7(a)–(e). In the present embodiment, the arbitrary joint is a parent joint and the adjacent joint is its child joint.

Figure 7B:
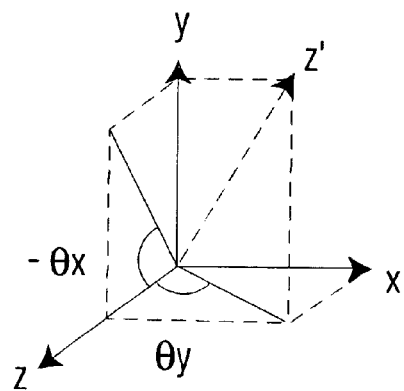
Figure 7C:
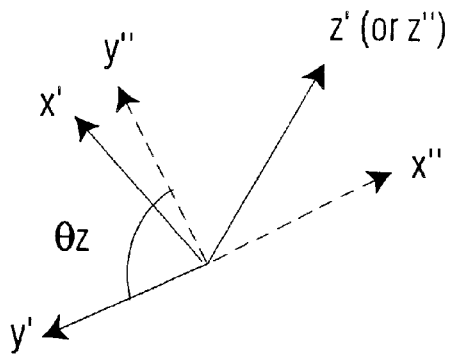
Figure 7D:
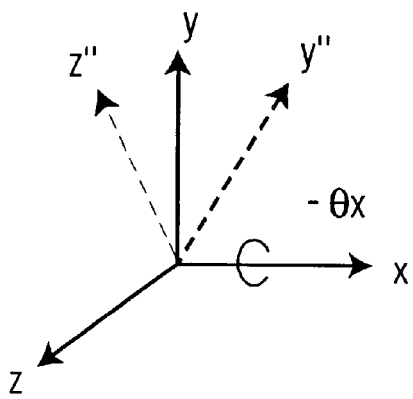
Figure 7E:
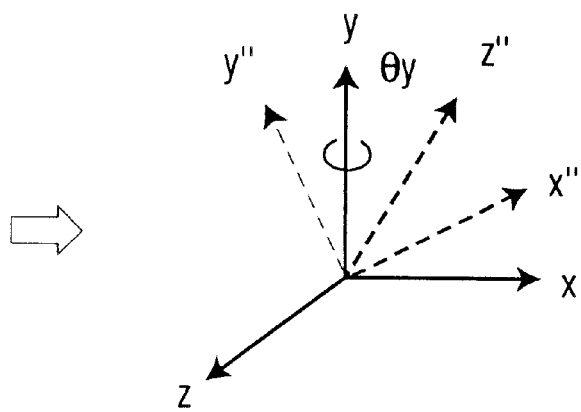

1. The origin of the unique coordinate system for the parent joint and that for the child joint are made to coincide with each other, as shown in FIG. 7(a).
2. An angle ($-\theta_x$) between the z axis and the coordinate axis resulting from the projection of the z' axis of the child joint to the yz plane of the unique coordinate system for the parent joint is obtained, as shown in FIG. 7(b).
3. An angle ($\theta_y$) between the z axis and the coordinate axis resulting from the projection of the z' axis of the child joint to the zx plane of the unique coordinate system for the parent joint is obtained, as shown in FIG. 7(b).
4. The x axis of the unique coordinate system for the parent joint is rotated through the angle $-\theta_x$, as shown in FIG. 7(d). Rotation of the unique coordinate system (x, y, z) by ($\theta_x$, 0, 0) gives a coordinate system (x, y", z").
5. Further, the y axis of the unique coordinate system for the parent joint is rotated through the angle $\theta_y$, as shown in FIG. 7(e). Rotation of the unique coordinate system (x, y", z") by ($\theta_x$, $\theta_y$, 0) gives a coordinate system (x", y", z").
6. After rotation by ($\theta_x$, $\theta_y$, 0), the coordinate axis z" coincides with the z' axis of the coordinate system for the child joint, as shown in FIG. 7(c). In this situation, the coordinate axis z" is rotated, and the angle that makes the coordinate system (x", y", z") coincide with the unique coordinate system for the child joint is denoted as $\theta_z$.
7. Thus, ($\theta_x$, $\theta_y$, $\theta_z$) is the three-dimensional joint angle for the arbitrary joint which is the parent joint.

Referring to FIG. 8, there is shown therein a diagram showing that when the unique coordinate system for the parent joint shown in FIG. 7 is rotated about its axes in the order of z, x, and y, the result of the rotation is the generation of a unique coordinate system for its child joint. This means that by using a three-dimensional joint angle for a joint and a unique coordinate system for that joint, a unique coordinate system for its child joint can be generated. In the present embodiment, it is assumed that the axis rotation is performed in the order of the z, x, and y axes, but the order of rotation is not limited to the illustrated example. For example, the rotation may be performed in the order of the x, y, and z axes. In any way, each of the three axes should be rotated once.

A detailed description will now be given of the prescribed function by which the joint angle displacing portion 14 displaces the three-dimensional joint angle for an arbitrary joint in accordance with a desired mode of action modification. The following describes five kinds of displacement modes used in the present embodiment. In the following description, the j axis corresponds to either the x axis, or y axis, or z axis in a unique coordinate system.

(1) Energy displacement mode

Referring to FIG. 9, there is shown therein a block diagram of a joint angle displacing portion 14 for displacing three-dimensional joint angle for each of joints in the energy displacement mode. A discrete cosine transform portion 91 treats the three-dimensional joint angle for each of joints as time series data in accordance with the following equation, applies a discrete cosine transform to the time series data, and outputs DCT coefficients.

$$Z_k(i, j) = \frac{2e_k}{N} \sum_{n=0}^{N-1} \theta_m(i, j) \cos \frac{\pi(2m+1)k}{2N}$$

$$k = 0, 1, 2, ..., N-1$$

$$e_k = \frac{1}{\sqrt{2}} \quad (k = 0)$$

$$e_k = 1 \quad (k = 1, 2, ..., N-1)$$

N: Total number of data blocks (total number of frames)
k: Order of DCT coefficient
m: Data number (frame number)
$\theta_m(i,j)$: Three-dimensional joint angle with respect to j axis of unique coordinate system for i-th joint in m-th frame
$z_k(i,j)$: k-order DCT coefficient for $\theta_m(i,j)$ A transform coefficient displacing portion 92 contains an energy displacing portion 93 and, using a parameter a, displaces the energy of each DCT coefficient output from the discrete cosine transform portion 91. Using the following equation, an inverse discrete cosine transform portion 94 applies an inverse discrete cosine transform to the energy-displaced DCT coefficients and outputs displaced three-dimensional joint angle for each of the joints.

$$\theta_m(i, j) = \frac{z_0(i, j)}{\sqrt{2}} + \sum_{k=1}^{N-1} a z_k(i, j) \cos \frac{\pi(2m+1)k}{2N}$$

N: Total number of data blocks (total number of frames)
k: Order of DCT coefficient
m: Data number (frame number)
a: Action modification setting parameter in energy displacement mode
$\theta_m(i,j)$: Three-dimensional joint angle with respect to j axis of unique coordinate system for i-th joint in m-th frame, after displacement According to the energy displacement mode, if the parameter a is set at a large value for the inverse transformation by the inverse discrete cosine transform portion 94, the resulting data represents an action with large movements; conversely, if the parameter a is set at a small value for the inverse transformation by the inverse discrete cosine transform portion 94, the resulting data represents an action with small movements. Therefore, with this mode, an action modification mode for transforming a walking action of a human in the standard action mode, for example, into an action of walking with long strides or with short steps can be realized using one parameter.

(2) Order displacement mode

Referring to FIG. 10, there is shown therein a block diagram of a joint angle displacing portion 14 for displacing the three-dimensional joint angle for each of joints in the order displacement mode. The discrete cosine transform portion 91, which is identical to the one shown in FIG. 9, treats the three-dimensional joint angle for each of joints as time series data, applies a discrete cosine transform to the time series data, and outputs DCT coefficients. A transform coefficient displacing portion 101 contains an order selection portion 102 and, using an order of M, displaces each DCT coefficient output from the discrete cosine transform portion 91. Using the following equation, an inverse discrete cosine transform portion 103 applies an inverse discrete cosine transform to the displaced DCT coefficients and outputs displaced three-dimensional joint angle for each of the joints.

$$\theta_m(i, j) = \frac{z_0(i, j)}{\sqrt{2}} + \sum_{k=1}^{M-1} z_k(i, j) \cos \frac{\pi(2m+1)k}{2N}$$

N: Total number of data blocks (total number of frames)
k: Order of DCT coefficient
M: Action modification setting parameter in order displacement mode
m: Data number (frame number)
$\theta_m(i,j)$: Three-dimensional joint angle with respect to j axis of unique coordinate system for i-th joint in m-th frame, after displacement For M when N>M, if the value decreases, the amount of data describing fine movements decreases; conversely, if the value increases, the amount of data describing fine movements increases. Accordingly, with this mode, an action modification mode capable of setting fine and delicate motion can be realized using one parameter.

(3) Action speed displacement mode

Referring to FIG. 11, there is shown therein a block diagram of a joint angle displacing portion 14 for displacing the three-dimensional joint angle for each of joints in the action speed displacement mode. To explain an action modification using only the action speed displacement mode, the following description assumes that the DCT coefficients input to a transform coefficient displacing portion 111 are output from it without displacement. The discrete cosine transform portion 91, which is identical to the one shown in FIG. 9, treats the three-dimensional joint angle for each of joints as time series data, applies a discrete cosine transform to the time series data, and outputs DCT coefficients. The transform coefficient displacing portion 111 outputs each input DCT coefficient without applying displacement. An inverse discrete cosine transform portion 112 contains a transform order limiting portion 113 and, using a parameter n in the following equation and using only the necessary order in the inverse discrete cosine transform, applies an inverse discrete cosine transform to each input DCT coefficient and outputs order-limited three-dimensional joint angle for each of the joints.

$$\theta_{mn}(i, j) = \frac{z_0(i, j)}{\sqrt{2}} + \sum_{k=1}^{N-1} z_k(i, j) \cos \frac{\pi(2mn+1)k}{2N}$$

$$m = 0, 1, 2, ..., \frac{N-1}{n}$$

N: Total number of data blocks (total number of frames)
k: Order of DCT coefficient
n: Speed setting parameter in action speed displacement mode θ$_{mn}$(i,j): Three-dimensional joint angle with respect to j axis of unique coordinate system for i-th joint in mn-th frame According to the action speed displacement mode, a desired action can be performed at a speed n times the standard action speed by setting the parameter n. Therefore, with this mode, an action modification mode capable of setting a slow action or quick action compared to the standard action mode can be realized using one parameter.

(4) Energy/order composite displacement mode

Figure 12:
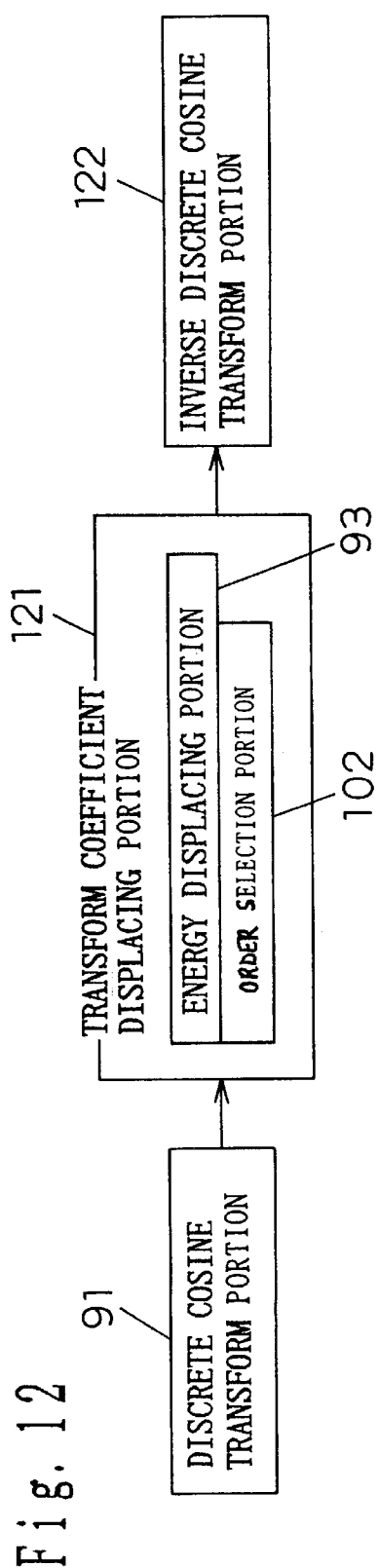
FIG. 12 is a block diagram of a joint angle displacing portion 14 for displacing a three-dimensional joint angle for each of joints in an energy/order composite displacement mode.

Referring to FIG. 12, there is shown therein a block diagram of a joint angle displacing portion 14 for displacing three-dimensional joint angle for each of joints in the energy/order composite displacement mode. The discrete cosine transform portion 91, which is identical to the one shown in FIG. 9, treats the three-dimensional joint angle for each of joints as time series data, applies a discrete cosine transform to the time series data, and outputs DCT coefficients. A transform coefficient displacing portion 121 contains an energy displacing portion 93, which is identical to the one shown in FIG. 9, and an order selection portion 102, which is identical to the one shown in FIG. 10. The energy displacing portion 93, using the parameter a, displaces the energy of each DCT coefficient output from the discrete cosine transform portion 91, while the order selection portion 102, using the order of M, displaces the energy of each DCT coefficient output from the discrete cosine transform portion 91. Using the following equation, an inverse discrete cosine transform portion 122 applies an inverse discrete cosine transform to the displaced DCT coefficients, and outputs displaced three-dimensional joint angle for each of the joints.

$$\theta_m(i, j) = \frac{z_0(i, j)}{\sqrt{2}} + \sum_{k=1}^{M-1} a z_k(i, j) \cos \frac{\pi(2m + 1)k}{2N}$$

N: Total number of data blocks (total number of frames)
k: Order of DCT coefficient
m: Data number (frame number)
M: Action modification setting parameter in order displacement mode
a: Action modification setting parameter in energy displacement mode
θ$_m$(i,j): Three-dimensional joint angle with respect to j axis of unique coordinate system for i-th joint in m-th frame According to this action modification mode, by selecting a relatively small parameter M while changing the magnitude of motion using the parameter a, a smooth motion can be presented. Further, as components of higher order are added by increasing the parameter M, a motion with finer movements can be expressed. Therefore, with this mode, an action modification mode capable of setting the magnitude of motion as well as the fine and delicate movement of motion can be realized using two parameters.

(5) Energy/order/action speed composite displacement mode

Figure 13:
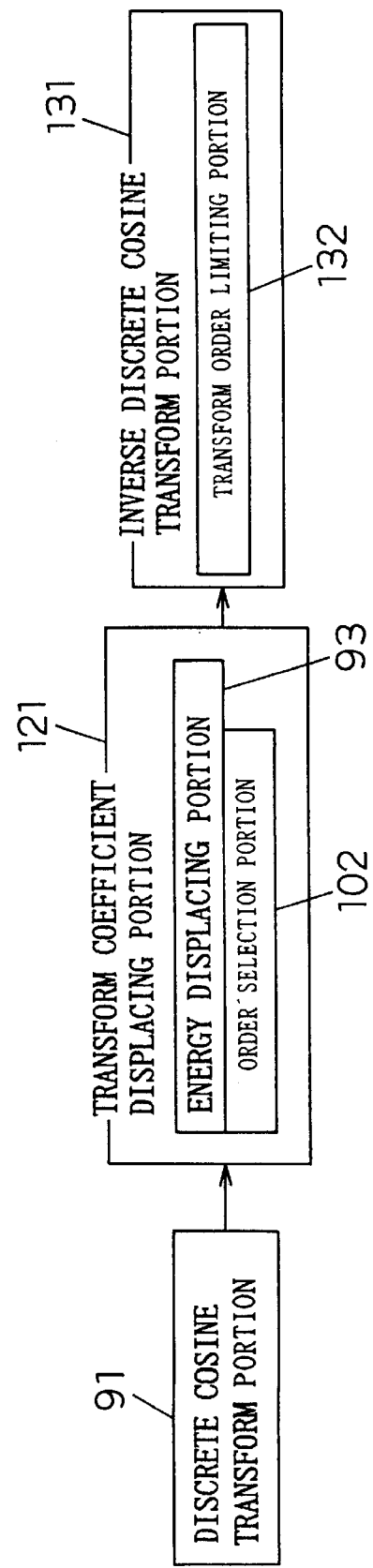
FIG. 13 is a block diagram of a joint angle displacing portion 14 for displacing a three-dimensional joint angle for each of joints in an energy/order/action speed composite displacement mode.

Referring to FIG. 13, there is shown therein a block diagram of a joint angle displacing portion 14 for displacing three-dimensional joint angle for each of joints in the energy/order/action speed composite displacement mode. The discrete cosine transform portion 91, which is identical to the one shown in FIG. 9, treats the three-dimensional joint angle for each of joints as time series data, applies a discrete cosine transform to the time series data, and outputs DCT coefficients. The transform coefficient displacing portion 121 contains an energy displacing portion 93, which is identical to the one shown in FIG. 9, and an order selection portion 102, which is identical to the one shown in FIG. 10. The energy displacing portion 93, using the parameter a, displaces the energy of each DCT coefficient output from the discrete cosine transform portion 91, while the order selection portion 102, using the order of M, displaces the energy of each DCT coefficient output from the discrete cosine transform portion 91. An inverse discrete cosine transform portion 131 contains a transform order limiting portion 132, and using the parameter n in the following equation, applies an inverse transform, with the order of the inverse discrete cosine transform limited, to the displaced DCT coefficients and outputs displaced three-dimensional joint angle for each of the joints.

$$\theta_{mn}(i, j) = \frac{z_0(i, j)}{\sqrt{2}} + \sum_{k=1}^{M-1} a z_k(i, j) \cos \frac{\pi(2mn + 1)k}{2N}$$

$$m = 0, 1, 2, \ldots, \frac{N-1}{n}$$

N: Total number of data blocks (total number of frames)
k: Order of DCT coefficient
M: Action modification setting parameter in order displacement mode
a: Action modification setting parameter in energy displacement mode
n: Speed setting parameter in action speed displacement mode
θ$_{mn}$(i,j): Three-dimensional joint angle with respect to j axis of unique coordinate system for i-th joint in mn-th frame According to this action modification mode, action speed can be set by using the parameter n, the magnitude of motion by using the parameter a, and fine and delicate movements of motion by using the parameter M. Therefore, with this mode, an action modification mode capable of simultaneously setting the action speed, the magnitude of motion, and fine and delicate movements of motion can be realized using three parameters.

The operation of the action synthesizing portion 16 of the present embodiment will now be explained in further detail. It is assumed here that the unique coordinate system for the root joint is set for an available joint that is unaffected by action modifications. In the present embodiment, the root joint is the waist joint 21 shown in FIG. 2(a). The action synthesizing portion 16 equipped with the unique coordinate system generating portion performs action synthesis in the following sequence.

1. The root joint is set as a parent joint (initial setting).
2. The origin of the unique coordinate system for the parent joint is set at the parent joint.
3. Geometric data corresponding to the parent joint is applied along the positive z axis starting from the origin of the unique coordinate system.
4. The end point of the geometric data opposite from the origin is set as the origin of the unique coordinate system for its child joint.
5. Using the three-dimensional joint angle for the parent joint, the unique coordinate system for the parent joint is rotated about its axes in the order of z, x, and y, and the resulting coordinate system is determined as the unique coordinate system for its child joint.

6. The child joint is now set as a parent joint for the following processing.
7. The above steps 2 to 6 are repeated until the processing for the respective available joints is completed for one frame.
8. The above steps 1 to 7 are repeated the same number of times as the desired number of cycles.

For simplicity, in the above explanation the mode of action modification has been assumed to cover all the available joints.

As described above, by using the unique coordinate system, it becomes possible to uniquely apply geometric data, and by using the three-dimensional joint angle, not only motions such as twisting and rotation can be expressed, but an action in the standard action mode can be easily modified in various ways by processing the three-dimensional joint angle using a function.

Figure 14:
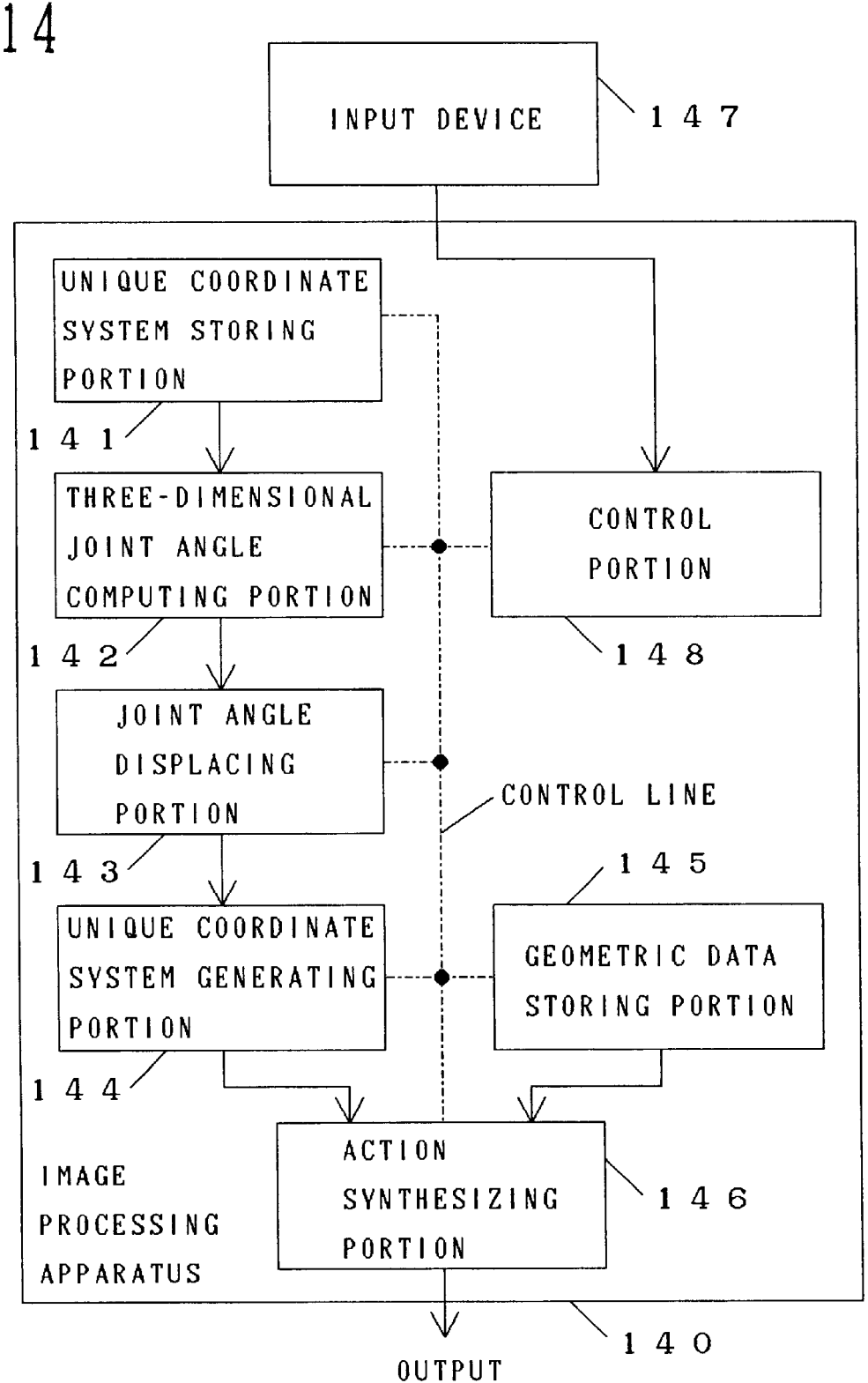
FIG. 14 is a block diagram of another embodiment of an image processing apparatus according to the present invention.

Referring now to FIG. 14, there is shown therein a block diagram of one embodiment of an image processing apparatus according to a second exemplary embodiment of the present invention. When a human performs a prescribed action, for example, the unique coordinate system for each of the available joints is stored in a unique coordinate system storing portion 141 on a frame-by-frame basis for one cycle of the action. A geometric data storing portion 145 stores geometric data on the human parts with respect to a plurality of unique coordinate systems for each of the available joints. An input device 147 is a device that the operator uses to input instructions for a desired action. A control portion 148 performs control for image processing in accordance with the instructions input at the input device 147. Based on the unique coordinate systems stored in the unique coordinate system storing portion 141, a three-dimensional joint angle computing portion 142 computes the three-dimensional joint angle for each of all or part of the available joints in accordance with the desired mode of action modification. Based on the three-dimensional joint angles computed by the three-dimensional joint angle computing portion 142, a joint angle displacing portion 143 displaces the three-dimensional joint angle for each of all or part of the available joints in accordance with the mode of action modification. Based on the three-dimensional joint angles computed by the three-dimensional joint angle computing portion 142 and/or the three-dimensional joint angles displaced by the joint angle displacing portion 143, a unique coordinate system generating portion 144 generates the unique coordinate system for each of all or part of the available joints in accordance with the mode of action modification. Based on the unique coordinate systems stored in the unique coordinate system storing portion 141 and/or the unique coordinate systems generated by the unique coordinate system generating portion 144, an action synthesizing portion 146 reads corresponding geometric data from the geometric data stored in the geometric data storing portion 145 and assigns the data to the available joints.

Figure 15:
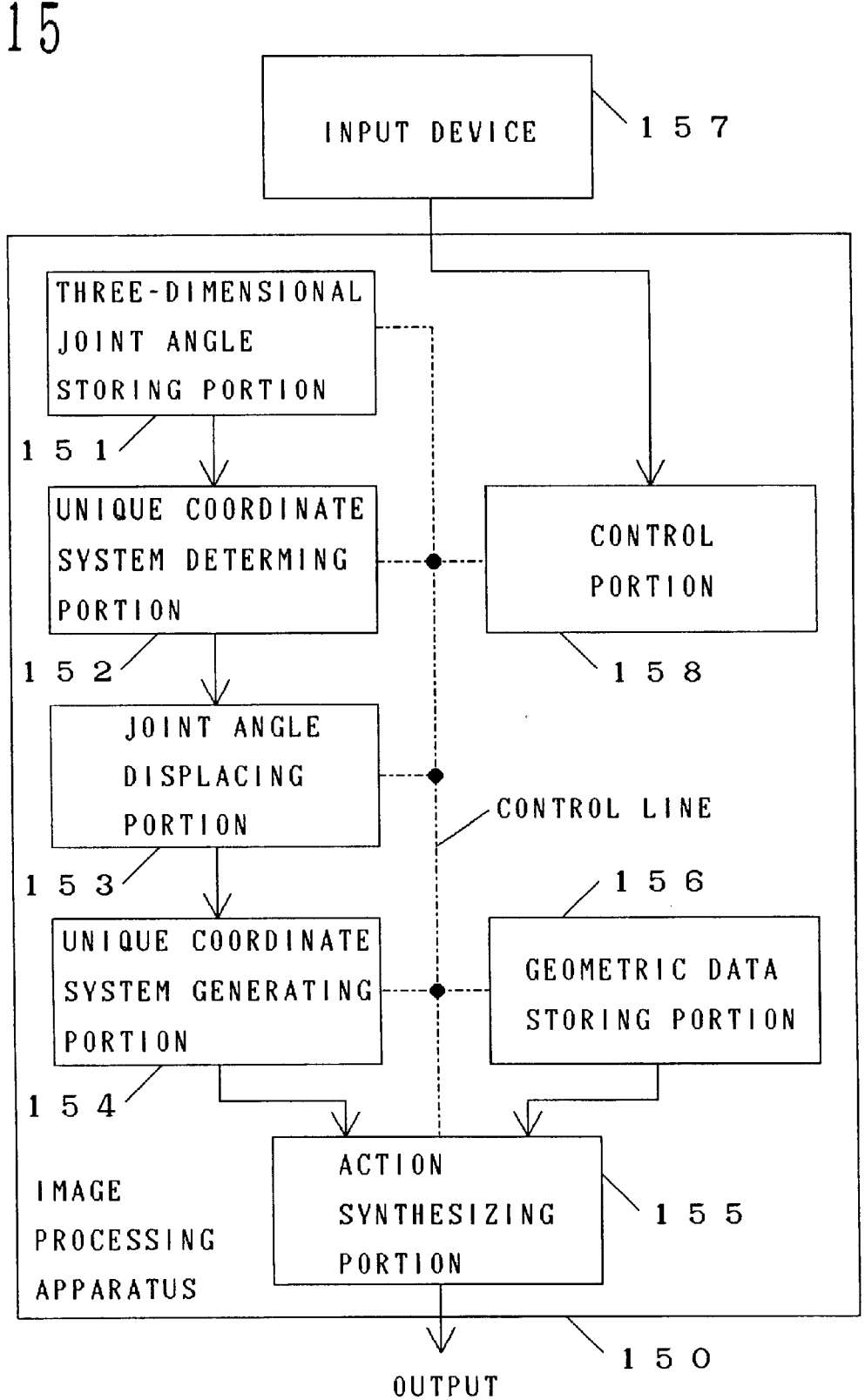
FIG. 15 is a block diagram of another embodiment of an image processing apparatus according to the present invention.

Referring now to FIG. 15, there is shown therein a block diagram of one embodiment of an image processing apparatus according to a third exemplary embodiment of the present invention. When a human performs a prescribed action, for example, the unique coordinate system for a root joint and the three-dimensional joint angle for each of the available joints are stored in a three-dimensional joint angle storing portion 151 on a frame-by-frame basis for one cycle of the action. A geometric data storing portion 156 stores geometric data on the human parts with respect to a plurality of unique coordinate systems for each of the available joints. An input device 157 is a device that the operator uses to input instructions for a desired action. A control portion 158 performs control for image processing in accordance with the instructions input at the input device 157. Using the unique coordinate system for the root joint and the three-dimensional joint angles stored in the three-dimensional joint angle storing portion 151, a unique coordinate system determining portion 152 determines the unique coordinate system for each of the available joints in the parent-child order starting from the root joint. Based on the three-dimensional joint angles stored in the three-dimensional joint angle storing portion 151, a joint angle displacing portion 153 displaces the three-dimensional joint angle for each of all or part of the available joints in accordance with the desired mode of action modification. Based on the three-dimensional joint angles stored in the three-dimensional joint angle storing portion 151 and/or the three-dimensional joint angles displaced by the joint angle displacing portion 153, a unique coordinate system generating portion 154 generates the unique coordinate system for each of all or part of the available joints in accordance with the mode of action modification. Based on the unique coordinate systems determined by the unique coordinate system determining portion 152 and/or the unique coordinate systems generated by the unique coordinate generating portion 154, an action synthesizing portion 155 reads corresponding geometric data from the geometric data stored in the geometric data storing portion 156 and assigns the data to the available joints.

In the above embodiments, image processing that matches the desired action is performed in accordance with the operator's instructions input via the input device 17, 147, or 157, but the present invention is not limited to such arrangement. Alternatively, provisions may be made so that image processing is performed in accordance with instructions in a program written to represent a moving image such as an animated cartoon.

Further, in the above embodiments, a unique coordinate system or a three-dimensional joint angle is specified by an available joint, but the present invention is not limited to such arrangement. Alternatively, provisions may be made so that a unique coordinate system or a three-dimensional joint angle is specified by a parent-child line which is a line between an available joint and the parent or child joint. In this case, a unique coordinate system for a parent-child line is equal to a coordinate system for an variable joint, and a three-dimensional joint angle for a parent-child line is equal to a three-dimensional joint angle for an available joint.

According to the image processing apparatus of the above embodiments, an image in a standard action can be synthesized in a simple way by using a unique coordinate system in which an applicable part of an object can be uniquely placed between a set of adjacent available joints and which can take into account the orientation of the object in a certain direction.

Further, according to the image processing apparatus of the above embodiments, motions such as twisting and rotation can be easily performed by using three-dimensional joint angles for available joints.

Still further, according to the image processing apparatus of the above embodiments, various action modifications can be generated easily by using unique coordinate systems and three-dimensional joint angles for available joints.

Figure 16:
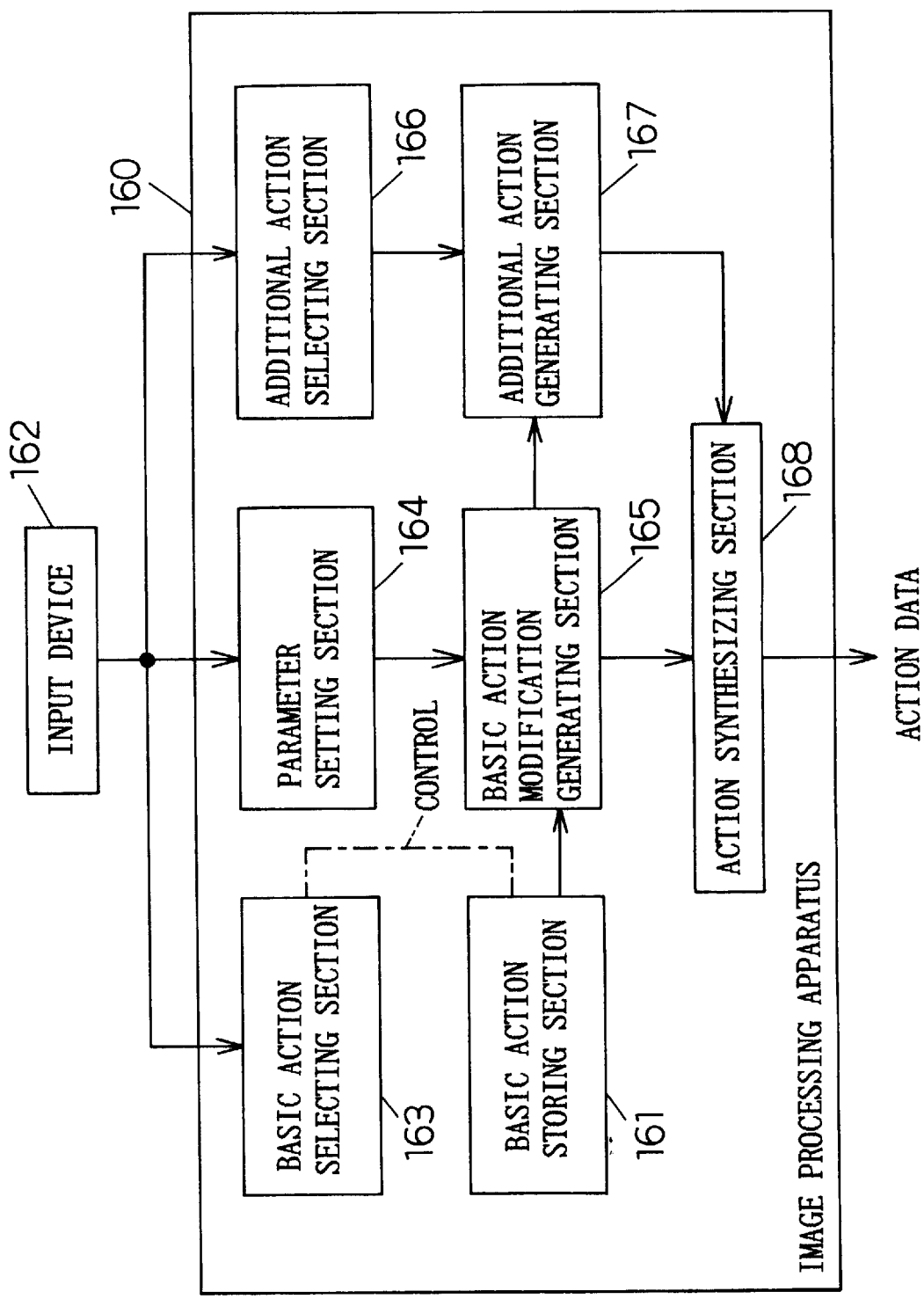
FIG. 16 is a block diagram of another embodiment of an image processing apparatus according to the present invention.

Referring to FIG. 16, there is shown therein a block diagram of an image processing apparatus according to a fourth exemplary embodiment of the present invention. When an object having a plurality of "available joints defining an action" performs a prescribed action, three-dimensional joint angles expressed in the form of a function for each of all or part of the available joints are stored as basic action data in a basic action storing section 161 of the image processing apparatus 160 on a frame-by-frame basis for the cyclic or noncyclic action performed by the object. This storing section may be contained in either an internal storage device or an external storage device to the image processing apparatus 160.

An input device 162 is a device that the operator uses to input instructions for a desired action.

A basic action selecting section 163, on the basis of the instructions input via the input device 162, selects the desired basic action data from among the plurality of basic action data stored in the basic action storing section 161. The basic action storing section 161 outputs the basic action data selected by the basic action selecting section 163, for input to a basic action modification generating section 165.

A parameter setting section 164, on the basis of the instructions input via the input device 162, sets an action modification parameter which becomes necessary when modifying an action constructed from the basic action data selected by the basic action selecting means into an action furnished with an action modification according to the instructions.

Using the action modification parameter set by the parameter setting section 164, the basic action modification generating section 165 modifies the action constructed from the basic action data selected by the basic action selecting section 163 and supplied from the basic action storing section 161, into the action furnished with the action modification desired by the operator, and thereby generates basic action modification data.

An additional action selecting section 166, on the basis of the instructions input via the input device 162, selects a desired additional action which is added to the action constructed from the basic action modification data; the additional action to be added is an action different from the action constructed from the basic action modification data generated by the basic action modification generating section 165.

An additional action generating section 167 generates additional action data on the basis of the basic action modification data generated by the basic action modification generating section 165 and the additional action selected by the additional action selecting section 166.

An action synthesizing device 168 combines the basic action modification data generated by the basic, action modification generating section 165 with the additional action data generated by the additional action generating section 167, and thereby generates action data concerning an action created by adding an action constructed from the additional action data to the action constructed from the basic action modification data.

The operation of this embodiment will now be explained. When the human skeleton model shown in FIG. 2(b) performs an action, the three-dimensional joint angles for its available joints exhibit temporal changes as shown in FIG. 17. In this way, an action can be expressed by the temporal changes of the three-dimensional joint angle for each of the available joints. Then, the temporal changes of the three-dimensional joint angles are approximated by a function which is applied to each of X-axis rotation $\theta_x$, Y-axis rotation 0 and Z-axis rotation $\theta_z$. In this embodiment, the discrete cosine transform expressed by the following Equation is used as the approximation function. Here, i corresponds to x, y, and z axes, and j denotes the number of frames, and k corresponds to available joints.

$$Z(i, j, k) = \frac{2e_k}{N} \sum_{n=0}^{N-1} \theta(i, j, n) \cos\frac{\pi(2n+1)k}{2N}$$

$$k = 0, 1, 2, \ldots, N-1$$

$$e_k = \frac{1}{\sqrt{2}} \quad (k = 0)$$

$$e_k = 1 \quad (k = 1, 2, \ldots, N-1)$$

Figure 18:
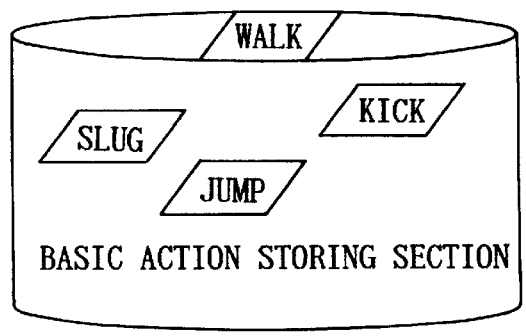
FIG. 18 is a diagram showing an example of a function approximation of FIG. 17 using a discrete cosine transform.

Referring to FIG. 18, there is shown therein an example of a function approximation of FIG. 17 using the discrete cosine transform. For a cyclic action such as walking, an action of one cycle is expressed in the form of a function. On the other hand, for a noncyclic action such as diving in a swimming race, the series of movements that completes the action is expressed in the form of a function. Basic action data such as "walking", "diving", etc. numerically approximated using the discrete cosine transform are stored in the basic action storing section 161. When an action is modeled using the DCT, the quality of the action can be modified by varying the order of the DCT. Generally, the energy is concentrated in the low-frequency components of the transform coefficients, as shown in FIG. 19. Therefore, if basic action data is stored in a database by ignoring the high-frequency components which have little effect on the reconstruction of the basic action, the database can be constructed with a smaller amount of data than when the time series data of the three-dimensional joint angles are stored as are.

The basic action selecting section 163, on the basis of the operator's instructions input via the input device 162, selects the desired basic action data from among the basic action data expressed in the form of a function and stored in the basic action storing section 161. We have previously described the five kinds of displacement modes in relation to the prescribed function that the joint angle displacing device 14 of FIG. 1 uses to displace three-dimensional angles. The parameter setting section 164 also can use similar action modification parameters. Using the action modification parameter set by the parameter setting section 164, the basic action modification generating section 165 generates three-dimensional joint angles from which to form basic action modification data, by applying an inverse discrete cosine transform to the basic action data selected by the basic action selecting section 163 and supplied from the basic action storing section 161.

More specifically, the parameter setting section 164, on the basis of the operator's instructions input via the input device 162, sets an action modification parameter containing the parameter "a" defining the action magnitude and the parameter "b" defining the action speed. Then, using the action modification parameter, the basic action modification generating section 165 applies the inverse discrete cosine transform of the following equation to the basic action data selected by the basic action selecting section 163.

$$\theta(i, j, nb) = \frac{z_0(i, j, 0)}{\sqrt{2}} + \sum_{k=1}^{M-1} az(i, j, k)\cos\frac{\pi(2nb+1)k}{2N}$$

$$n = 0, 1, 2, \ldots, \frac{N-1}{b}$$

Here, for the action magnitude defined by the parameter "a", when a=1.0, an action of the same magnitude as the basic action data stored in the basic action storing section 161 is generated; on the other hand, when a>1.0, an action of larger magnitude is generated, and when 0<a<1.0, an action of smaller magnitude is generated. Likewise, for the action speed defined by the parameter "b", when b=1.0, an action of the same speed as the basic action data stored in the basic action storing section 161 is generated; on the other hand, when b>1.0, an action of a higher speed is generated, where the parameter "b" is an integer. In this manner, by manipulating these two parameters, action modification can be implemented easily. In the case of action modification when a=1 and b=1, the basic action data selected by the basic action selecting section 163 is used without modification, but this is also treated here as a mode of action modification.

The additional action selecting section 166 selects additional action in accordance with the operator's instructions input via the input device 162. This additional action is an action different from the action constructed from the basic action modification data generated by the basic action modification generating section 165, and is added to the thus constructed action. Based on the basic action modification data generated by the basic action generating section 165 and the additional action selected by the additional action selecting section 166, the additional action generating section 167 generates additional action data. For example, an additional action "waving a hand" is added to a basic action "walking". The action synthesizing section 168 combines the basic action modification data generated by the basic action modification generating section 165 with the additional action data generated by the additional action generating section 167, and thereby generates action data concerning an action created by adding an action constructed from the additional action data to the action constructed from the basic action modification data.

In the present embodiment, the basic action selecting section 163 is constructed to have the basic action storing section 161 output the selected basic action data to the basic action modification generating section 165, but the embodiment is not limited to such arrangement. For example, the basic action selecting section 163 may be constructed to read the selected basic action data from the basic action storing section 161 and output it to the basic action modification generating section 165.

Furthermore, in the present embodiment, action parameters are set in accordance with the instructions input via the input device 162, but the embodiment is not limited to such arrangement. Instead, the parameter setting section 164 may be equipped with an input section for an operator to input desired action modification parameters.

Further, in the present embodiment, image processing that matches the desired action is performed in accordance with the operator's instructions input via the input device 162, but the embodiment is not limited to such arrangement. For example, provisions may be made so that image processing is performed in accordance with instructions in a program written to generate a moving image such as an animated cartoon.

Moreover, in the configuration of the present embodiment shown in FIG. 16, the additional action generating section 167 generates additional action data by considering the basic action modification data generated by the basic action modification generating section 165, and the action synthesizing section 168 combines the basic action modification data with the additional action data. The present embodiment, however, is not limited to this configuration. Alternatively, the additional action generating section 167 may be constructed to generate additional action data without considering the basic action modification data, in which case the action synthesizing section 168 combines the basic action modification data with the additional action data generated by the additional action generating section 167, by considering the basic action modification data.

Figure 20:
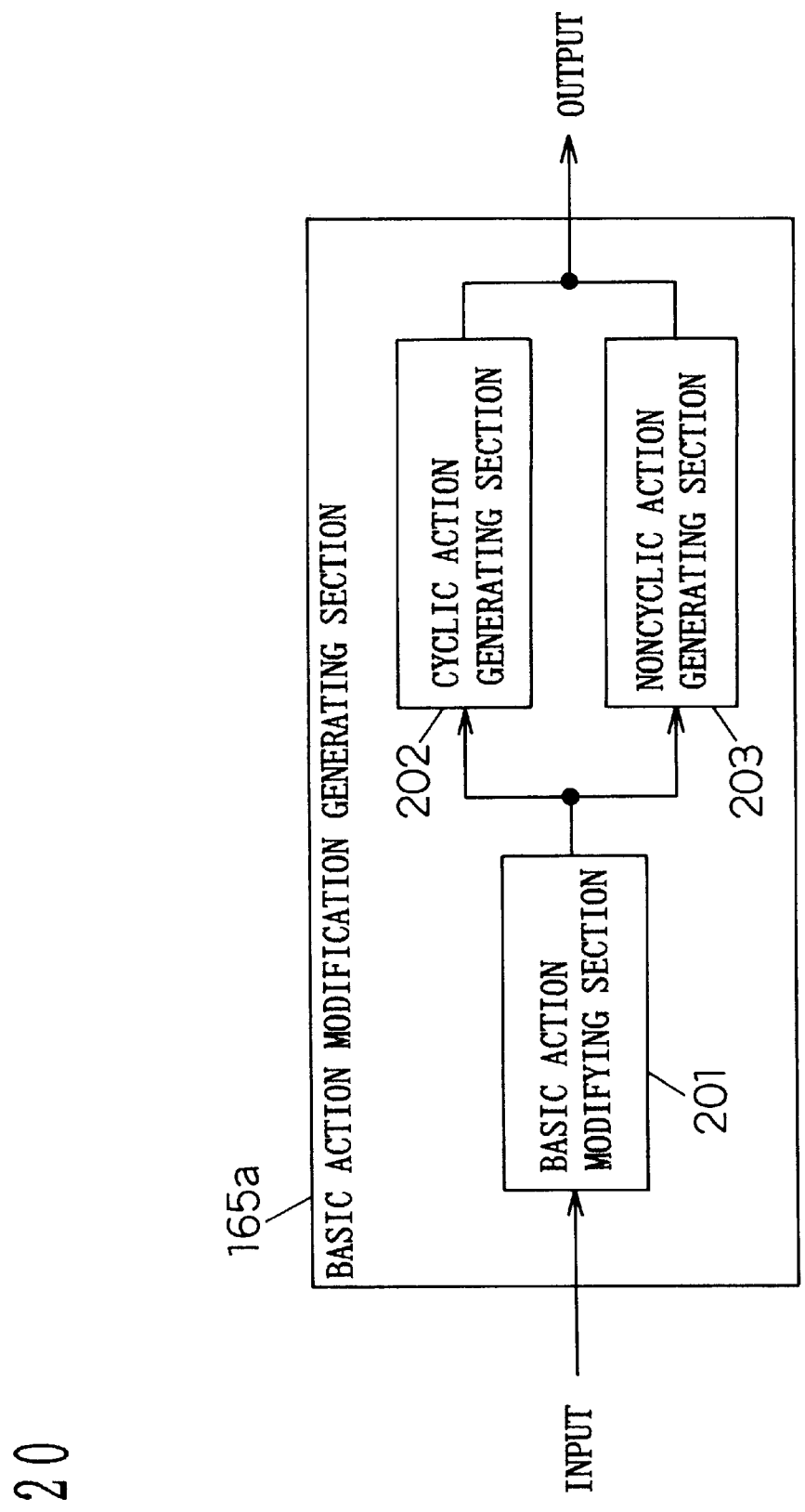
FIG. 20 is a block diagram showing another embodiment of the basic action modification generating section 165 shown in FIG. 16.

Referring to FIG. 20, there is shown therein a block diagram showing another embodiment of the basic action modification generating section 165 shown in FIG. 16. The basic action modification generating section 165*a* shown here includes a basic action modifying section 201 which, using the action modification parameter set by the parameter setting section 164 of FIG. 16, applies the same inverse discrete cosine transform as used in the basic action modification generating section 165 to the basic action data selected by the basic action selecting section 163 and supplied from the basic action storing section 161, and thereby calculates three-dimensional joint angles for each of the available joints. When the action processed in the basic action modifying section 201 is a cyclic action, a cyclic action generating section 202 generates basic action modification data by repeating the three-dimensional joint angles, calculated for one cycle of the action, the same number of times as the desired number of cycles. On the other hand, when the action processed in the basic action modifying section 201 is a noncyclic action, a noncyclic action generating section 203 generates basic action modification data from the calculated three-dimensional joint angles without repeating.

Figure 21:
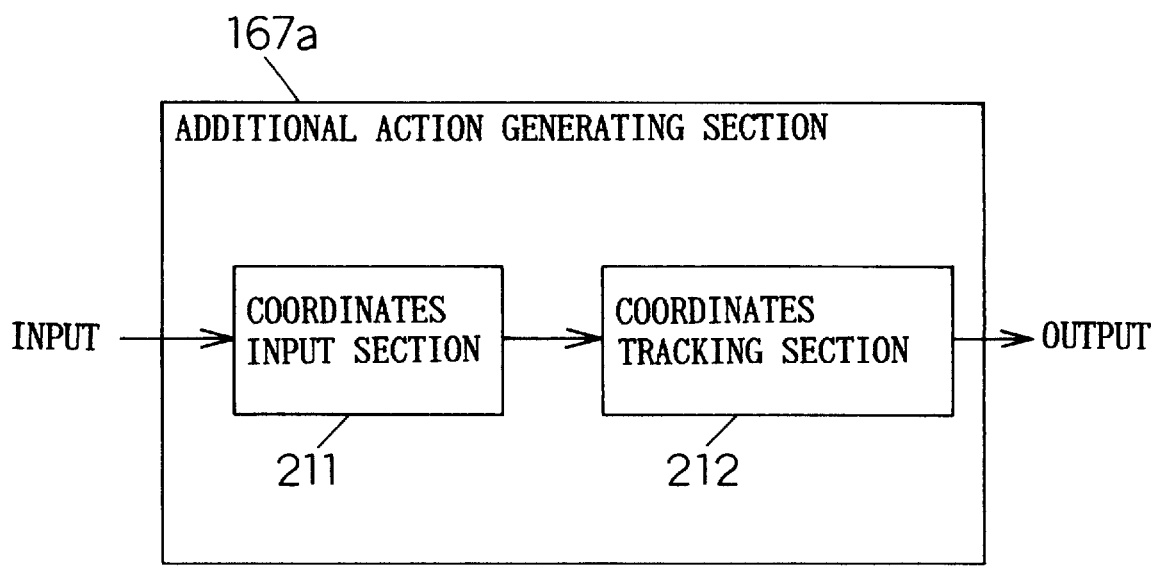
FIG. 21 is a block diagram showing another embodiment of the additional action generating section 167 shown in FIG. 16.

Referring to FIG. 21, there is shown therein a block diagram showing another embodiment of the additional action generating section 167 shown in FIG. 16. The additional action generating section 167*a* shown here includes a coordinates input section 211 to which coordinates are input that move in corresponding relationship to the additional action selected by the additional action selecting section 166 shown in FIG. 16. Data concerning the moving coordinates are associated with the additional action and stored in the same storage device that contains the basic action storing section 161 or in a separate storage device. A coordinates tracking section 212 generates additional action data by having the endmost of the available joints defining the additional action selected by the additional action selecting section 166 follow the coordinates input from the coordinates input section 211, by considering the action constructed from the basic action data generated by the basic action generating section 165. The coordinates tracking section 212 uses inverse kinematics.

A calculation method of inverse kinematics will now be explained in detail. The description hereinafter is given by taking as an example an additional action representing a human trying to catch a ball with his right hand. Let the three-dimensional joint angles of the elbow joint and shoulder joint be $(\theta_{1x}, \theta_{1y}, \theta_{1z})$ and $(\theta_{2x}, \theta_{2y}, \theta_{2z})$, respectively. Further, let the length from the shoulder to the elbow be denoted as $l_{1x}$ and the length from the elbow to the hand as $l_{2z}$. In this case, the coordinates r of the fingertip position with reference to the shoulder coordinate system can be expressed by the following equation. Here, o is the origin of the shoulder coordinate system. Further, $X\theta^{}, Y\theta^{}, Z\theta^{}$, and $L_1^{}$ respectively indicate a matrix rotated about X axis, a matrix rotated about Y axis, a matrix rotated about Z axis, and a matrix translated along Z axis.

$$r = Y_{\theta_{2y}} X_{\theta_{2x}} Z_{\theta_{2z}} L_{l_{2z}} Y_{\theta_{1y}} X_{\theta_{1x}} Z_{\theta_{1z}} L_{l_{1z}} o$$

$$r = F(\theta_{1x}, \theta_{1y}, \theta_{1z}, \theta_{2x}, \theta_{2y}, \theta_{2z})$$

$$r = [\begin{matrix} x & y & z & 1 \end{matrix}]^t$$

-continued $$O = [0\ 0\ 0\ 1]^t$$

$$X_{\theta_{}} = \begin{bmatrix} 1 & 0 & 0 & 0 \\ 0 & \cos\theta_{} & -\sin\theta_{} & 0 \\ 0 & \sin\theta_{} & \cos\theta_{**} & 0 \\ 0 & 0 & 0 & 1 \end{bmatrix}$$

$$Y_{\theta_{}} = \begin{bmatrix} \cos\theta_{} & 0 & \sin\theta_{} & 0 \\ 0 & 1 & 0 & 0 \\ -\sin\theta_{} & 0 & \cos\theta_{**} & 0 \\ 0 & 0 & 0 & 1 \end{bmatrix}$$

$$Z_{\theta_{}} = \begin{bmatrix} \cos\theta_{} & -\sin\theta_{} & 0 & 0 \\ \sin\theta_{} & \cos\theta_{**} & 0 & 0 \\ 0 & 0 & 1 & 0 \\ 0 & 0 & 0 & 1 \end{bmatrix}$$

$$L_{l_{}} = \begin{bmatrix} 1 & 0 & 0 & 0 \\ 0 & 1 & 0 & 0 \\ 0 & 0 & 1 & l_{} \\ 0 & 0 & 0 & 1 \end{bmatrix}$$

$** = 1x, 1y, 1z, 2x, 2y, 2z$

Since these four equations (r, r, r & o) are nonlinear with respect to Θ, by the velocity decomposition method the amount of change of the fingertip position becomes linear with respect to the amount of change of Θ, which is expressed by the following equation, where J is called the Jacobian which is a matrix whose elements are partial derivatives of functions.

$$\delta r = J\delta\Theta$$

$$J = \begin{bmatrix} \frac{\partial F_{11}}{\partial \theta_{1x}} & \frac{\partial F_{12}}{\partial \theta_{2x}} & \frac{\partial F_{13}}{\partial \theta_{3x}} & \cdots \\ \frac{\partial F_{21}}{\partial \theta_{1x}} & \frac{\partial F_{22}}{\partial \theta_{2x}} & \frac{\partial F_{23}}{\partial \theta_{3x}} & \cdots \\ \vdots & \vdots & \vdots & \ddots \end{bmatrix}$$

$$\Theta = [\theta_{1x}\ \theta_{1y}\ \theta_{1z}\ \theta_{2x}\ \theta_{2y}\ \theta_{2z}]^t$$

Since J, generally, is not regular, it is multiplied by its transposed matrix $J^t$ from the left side to obtain regular $J^tJ$. When there exists an inverse matrix to $J^tJ$, $\delta\Theta$ can be obtained as shown by the following equation.

$$\delta\Theta = (J^tJ)^{-1}J^t\delta r$$

Figure 23:
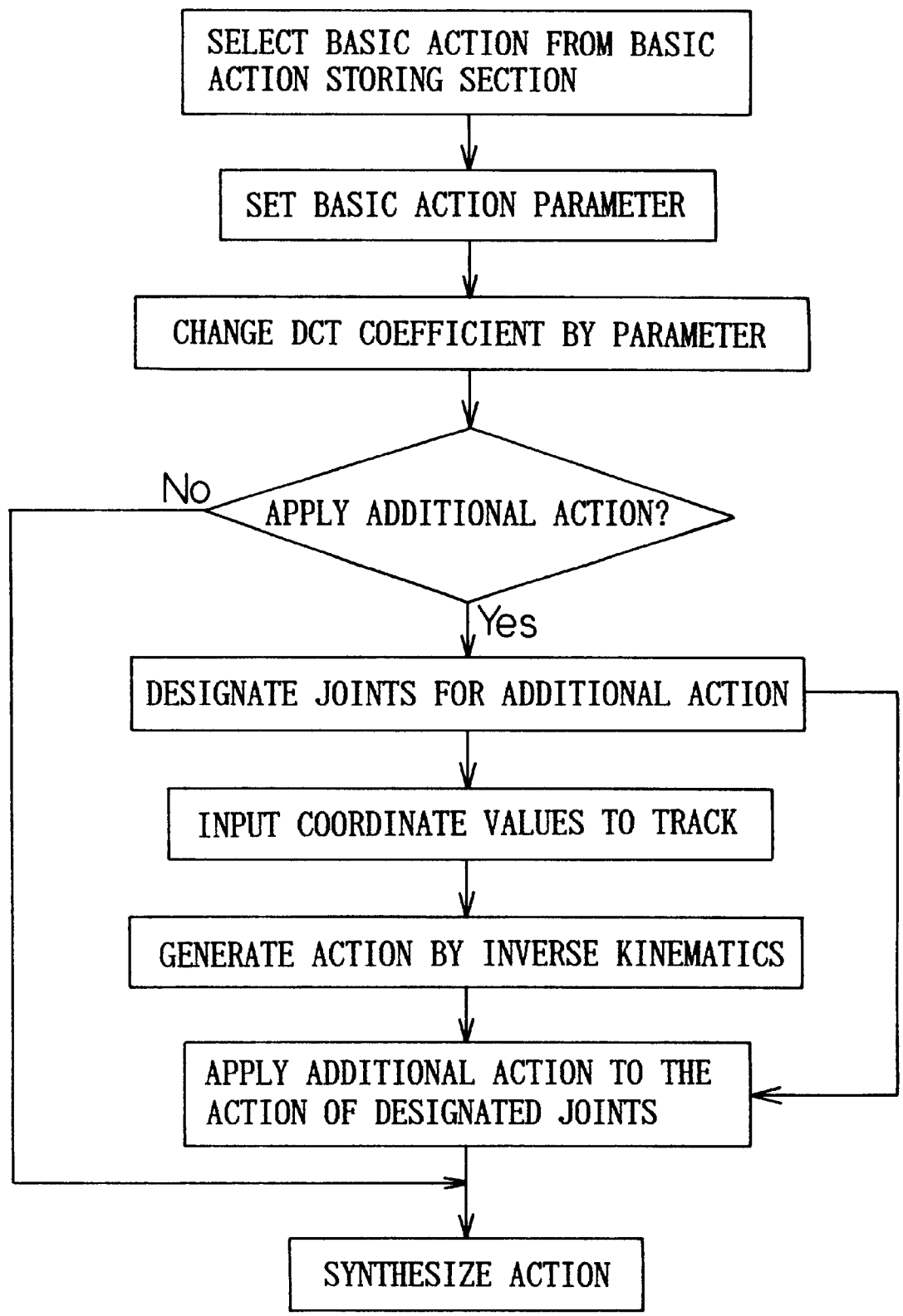

Accordingly, by inputting the amount of movement, δr, of the ball as the amount of movement of the fingertip, the amount of change, δΘ, of the three-dimensional joint angle for each of available joints can be calculated, and additional action data can thus be generated. An action, "walking"+ "trying to catch a ball", can thus be implemented as shown in FIG. 22. In this way, by applying an action different from the basic action to part of the joints by using inverse kinematics, an action responsive to the situation can be presented. FIG. 23 is a flow chart illustrating the operation of the image processing apparatus of FIG. 16 equipped with the additional action generating section 167a.

Figure 24:
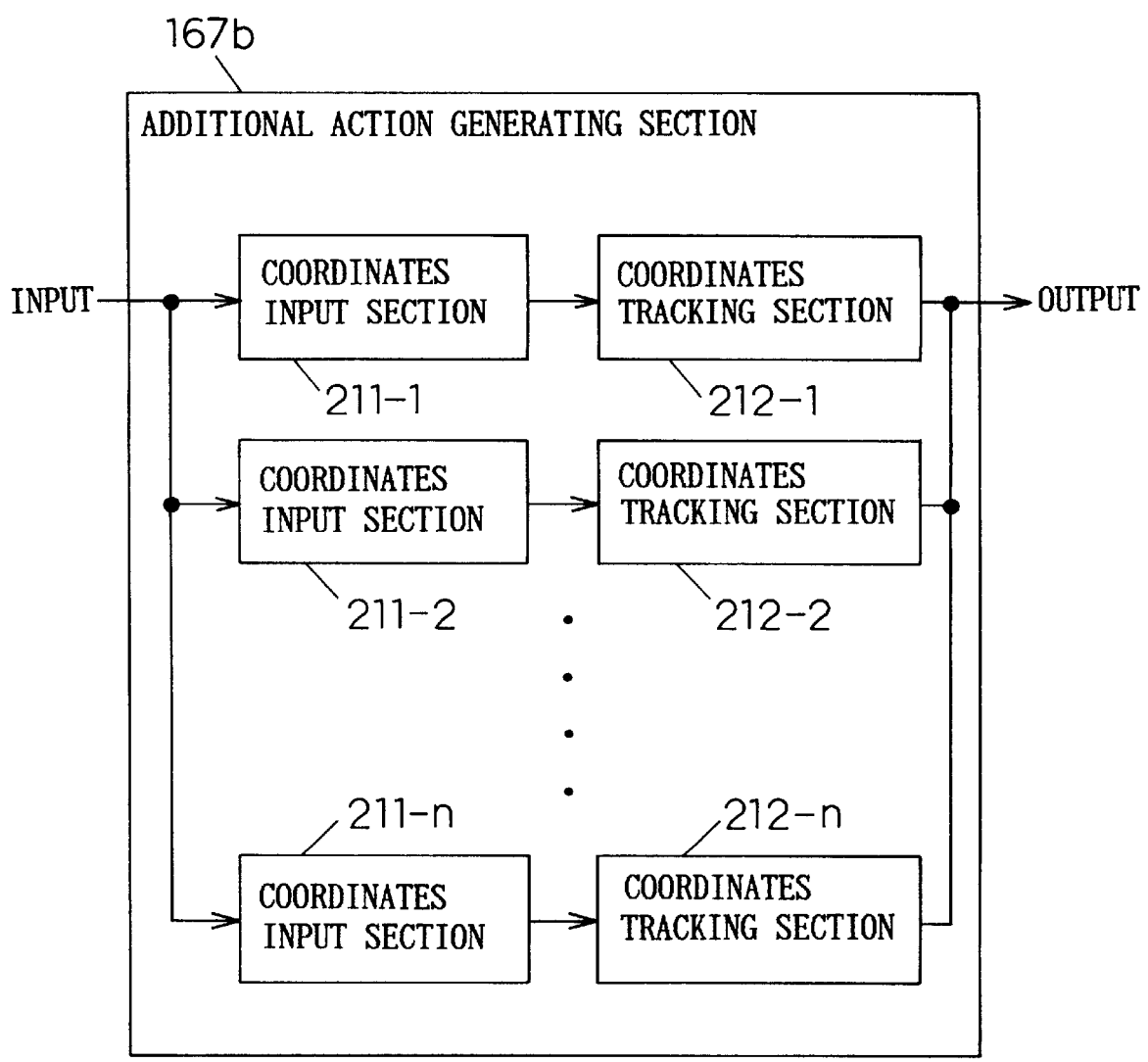
FIG. 24 is a block diagram showing another embodiment of the additional action generating section 167 shown in FIG. 16.

Referring to FIG. 24, there is shown therein a block diagram showing another embodiment of the additional action generating section 167 shown in FIG. 16. The additional action generating section 167b shown here comprises a plurality of coordinates input sections 211-1 to 211-n, and a plurality of coordinates tracking sections 212-1 to 212-n disposed in corresponding relationship to the respective input sections. The coordinates input section and coordinates tracking section in each pair generate additional action data in the same manner as in FIG. 21. With this configuration, additional action data can be generated for a human's left and right arms and left and right legs, for example. When each target coordinate set is denoted by $r_k(x_k, y_k, z_k)$, the processing performed by the additional action generating section on the available joints corresponding to the respective target coordinate sets is given by the following equation.

$$\delta\Theta_k = (J_k^t J_k)^{-1} J_k^t \delta r_k$$

$$J_k = \frac{\partial F(\Theta_k)}{\partial \theta_{ki}}$$

In the same manner as in FIG. 21, the amount of change of the three-dimensional joint angle for each of available joints is obtained from the target amount of movement. $\delta r_k$ is the amount of movement, $(\delta_x, \delta_y, \delta_z)$, of the k-th target coordinate set, $J_k$ is the Jacobian of matrix $F(\Theta_k)$, and $\Theta_k$ is $(\theta_{k1}, \theta_{k2}, \ldots, \theta_{kN})t$. In this way, a target following action can be applied independently to each individual available joint. It is therefore possible to present a further complex action such as following different targets with right and left hands while walking.

Figure 25:
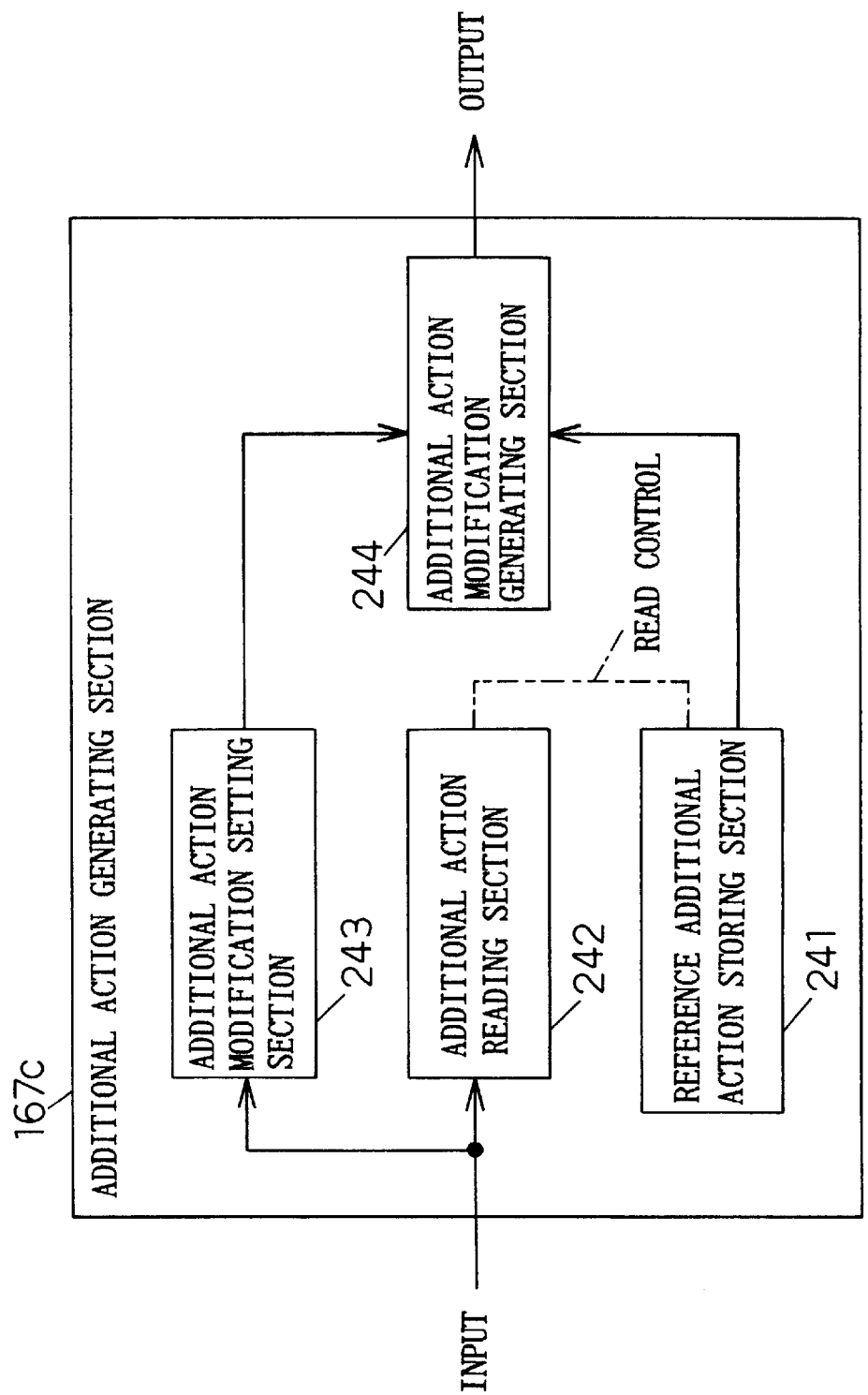
FIG. 25 is a block diagram showing another embodiment of the additional action generating section 167 shown in FIG. 16.

Referring to FIG. 25, there is shown therein a block diagram showing another embodiment of the additional action generating section shown in FIG. 16. The additional action generating section 167c shown here includes a reference additional action storing section 241 in which data concerning the three-dimensional joint angles for each of all or part of the available joints are stored as reference additional action data on a frame-by-frame basis for a prescribed additional action. For example, the reference additional action storing section 241 stores therein movements relating to arms, legs, a head, etc. in the form of functions. Movements relating to a head include such actions as "nodding", "shaking a head", etc. Movements relating to an arm include, for example, an action "waving a hand", while movements relating to a leg include an action "kicking", etc. As in the basic action storing section 161 of FIG. 16, the reference additional action storing section 241 stores transformed data obtained by applying the discrete cosine transform to the temporal changes of the three-dimensional joint angles. The reference additional action storing section 241 may be contained either in the same storage device that contains the basic action storing section 161 or in a separate storage device.

An additional action reading section 242 reads from among the plurality of reference additional action data stored in the reference additional action storing section 241 the reference additional action data corresponding to the additional action selected by the additional action selecting section 166 shown in FIG. 16, and supplies it to an additional action modification generating section 244.

An additional action modification setting section 243 sets an action modification parameter appropriate to the additional action selected by the additional action selecting section 166. It is assumed that the same action modification parameters as used in the parameter setting section 164 shown in FIG. 16 are also used here.

The additional action modification generating section 244 modifies the reference additional action data read out by the additional action reading section 242, by considering the basic action modification data generated by the basic action modification generating section 165 and by using the action modification parameter set by the additional action modification setting section 243, and thereby generates additional action data.

More specifically, using the action modification parameter set by the additional action modification setting section 243, the additional action modification generating section 244 applies the same inverse discrete cosine transform as used in the basic action modification generating section 165 to the reference additional action data read out by the additional action reading section 242, and thereby calculates the three-dimensional joint angles.

The operation of the additional action generating section 167c will now be explained by taking a case in which an additional action "waving a hand" is added to the basic action "walking". When the additional action selected by the additional action selecting section 166 is an action "waving a hand with a big motion", the additional action reading section 242 reads an action "waving a hand" from the reference additional action storing section 241. The additional action modification setting section 243 sets an action modification parameter appropriate to the "big motion" of the additional action selected by the additional action selecting section 166. In this case, the parameter "a" is set at a larger value than 1.0. Using the action modification parameter defining an action with a big motion, the additional action modification generating section 244 modifies the retrieved action "waving a hand" and generates additional action data representing an action "waving a hand with a big motion."

Furthermore, by setting the action modification parameter "b" at a larger value than 1.0, an action modification "quick" can be added to the action "waving a hand."

Figure 26:
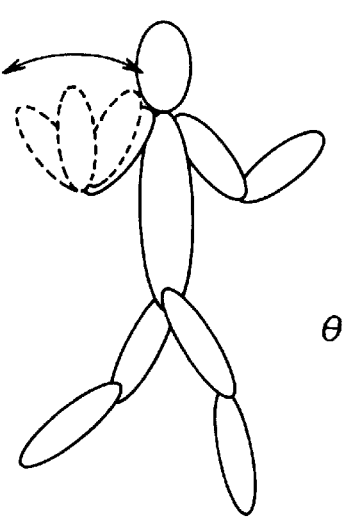
FIG. 26 is a diagram showing an implementation of an action "walking" "waving a hand (with a big motion)"
Figure 27:
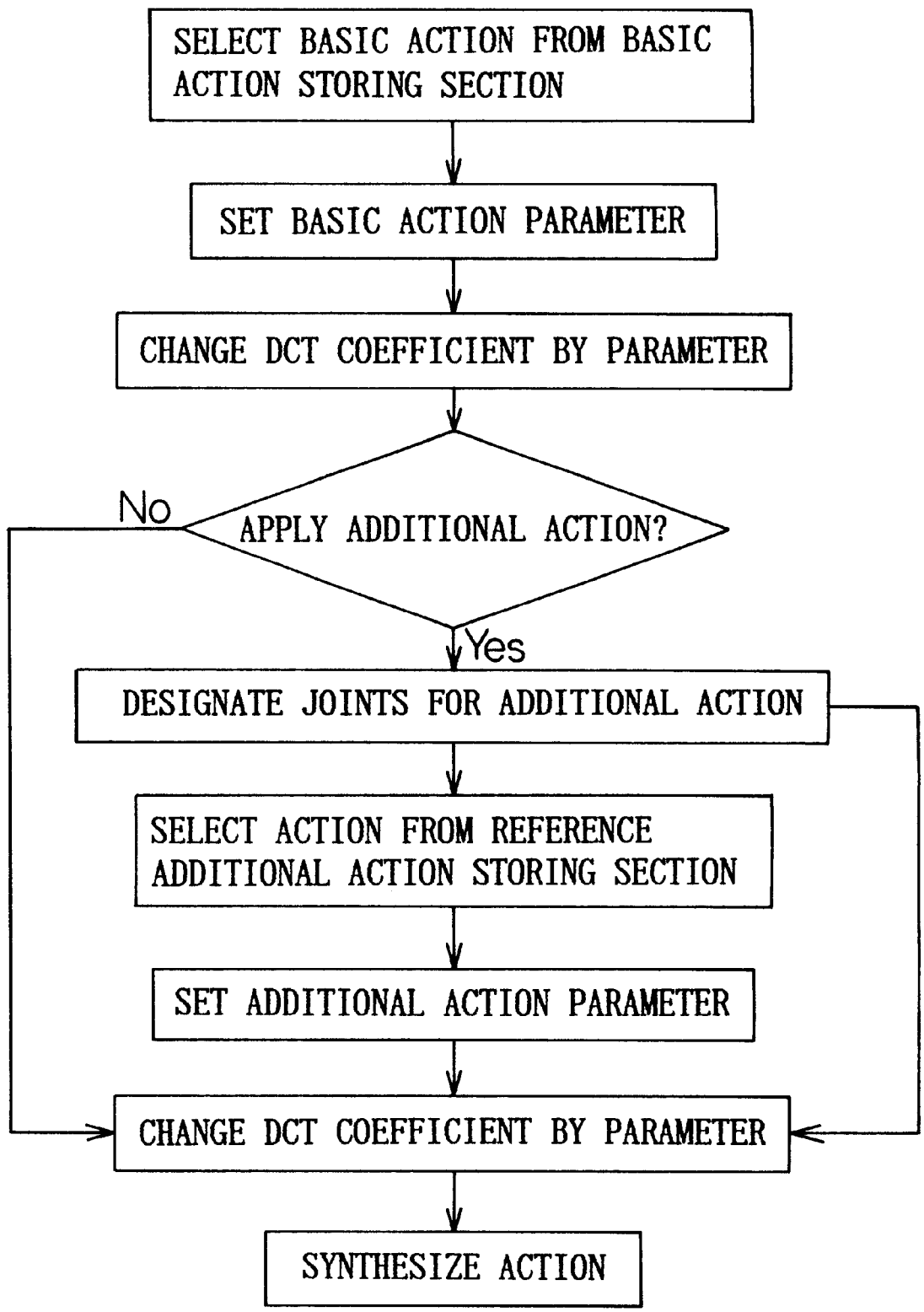
FIG. 27 is a flow chart illustrating the operation of the image processing apparatus of FIG. 16 equipped with an additional action generating section 167c.

In this way, an action, "walking"+"waving a hand (with a big motion)", can be implemented as shown in FIG. 26. It is thus possible to present an action responsive to the situation by adding a meaningful partial action as an additional action. Moreover, by changing the action modification parameter for the additional action data, an action with a big motion or a small motion can be presented. FIG. 27 is a flow chart illustrating the operation of the image processing apparatus of FIG. 16 equipped with the additional action generating section 167c.

Figure 28:
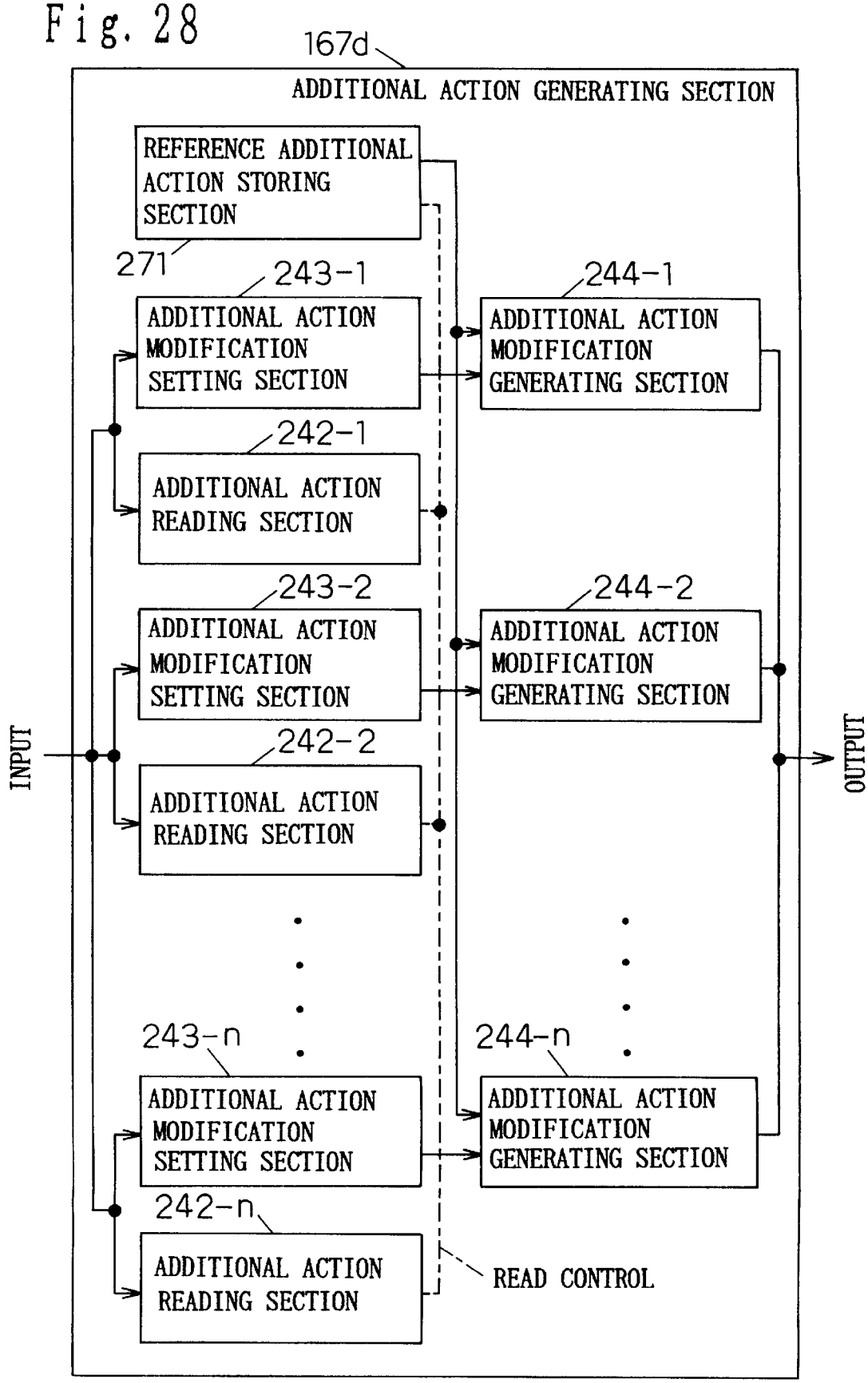
FIG. 28 is a block diagram showing another embodiment of the additional action generating section 167 shown in FIG. 16.

Referring to FIG. 28, there is shown therein a block diagram showing another embodiment of the additional action generating section 167 shown in FIG. 16. The additional action generating section 167d shown here is capable of generating a plurality of additional action data; each component part is the same as the corresponding part shown in FIG. 25. A reference additional action storing section 271 stores data concerning the three-dimensional joint angles for each of all or part of the available joints as reference additional action data on a frame-by-frame basis for a prescribed additional action.

The additional action reading sections, 242-1 to 242-n, respectively read from among the plurality of reference additional action data stored in the reference additional action storing section 271 the reference additional action data corresponding to the additional action selected by the additional action selecting section shown in FIG. 16, and supply the data to the respective additional action modification generating sections 244-1 to 244-n.

The additional action modification setting sections, 243-1 to 243-n, respectively set action modification parameters appropriate to the additional action selected by the additional action selecting section 166.

The additional action modification generating section, 244-1 to 244-n, modify the reference additional action data read out by the additional action reading sections, 242-1 to 242-n, respectively, by considering the basic action modification data generated by the basic action modification generating section 165 shown in FIG. 16 and by using the action modification parameters set by the additional action modification setting sections 243-1 to 243-n, and thereby generate additional action data.

According to the image processing apparatus of FIG. 16 equipped with the above additional action generating section 167d, a plurality of additional actions can be selected for addition to a basic action. The additional action generating section 167d sets action modification parameters individually for the plurality of additional actions selected by the additional action selecting section 166, and generates a plurality of additional action data based on the parameters.

For example, it is possible to add additional actions "nodding" and "waving a hand" to the basic action "walking". At this time, by changing the action modification parameters, it is possible to simultaneously implement such actions as nodding with a big motion, nodding quickly, waving a hand with a big motion, waving a hand quickly, etc. In this way, actions with more variations can be generated.

Figure 29:
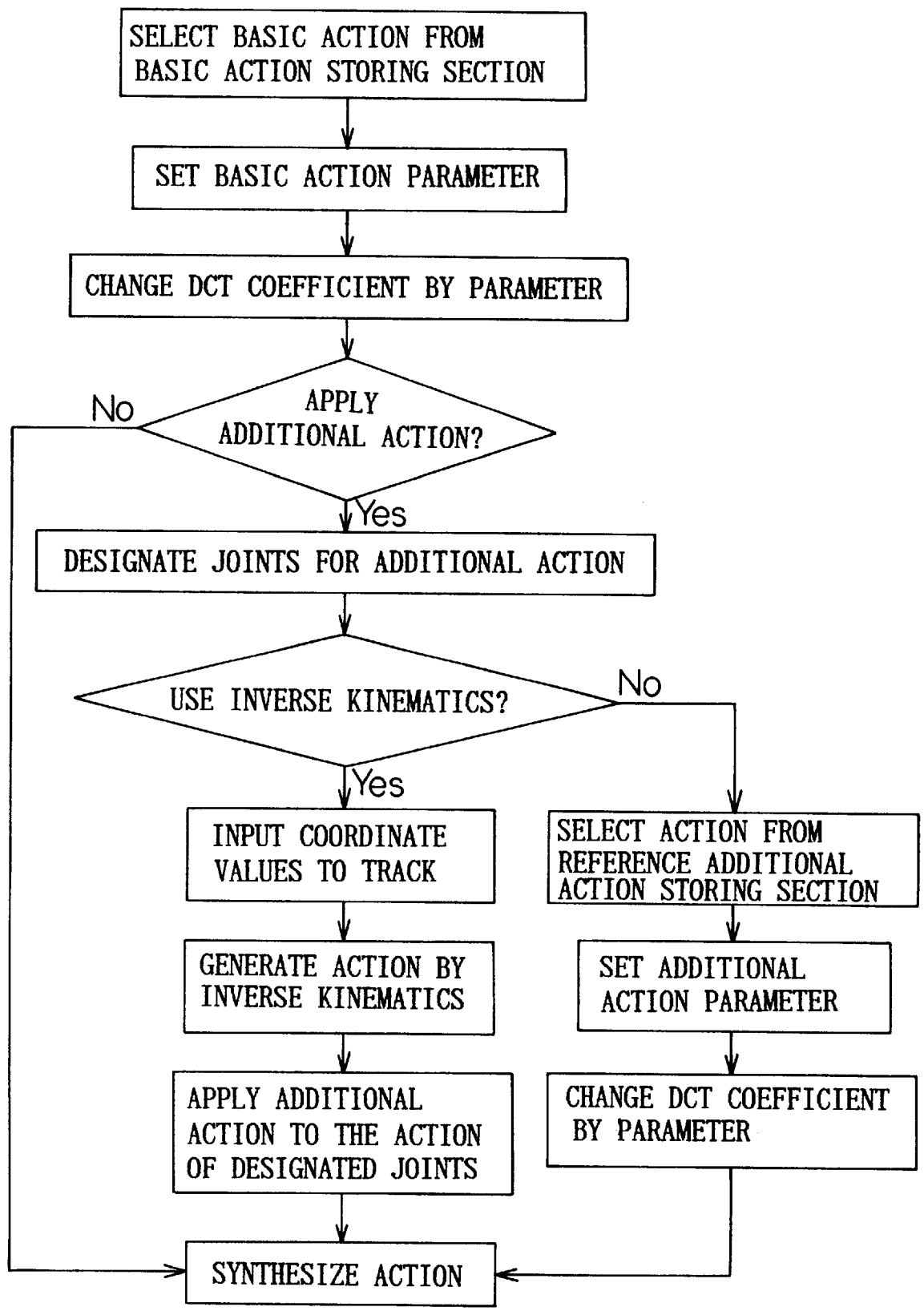
FIG. 29 is a flow chart illustrating the flow of processing when a method using a database and a method using inverse kinematics are combined.

Furthermore, by combining a method using a database with a method using inverse kinematics for the creation of additional actions, further flexible action generation can be achieved. For example, it is even possible to present an action "walking with long strides, while trying to catch a ball with the left hand and waving the right hand with a big motion". FIG. 29 is a flow chart illustrating the flow of processing when a method using a database and a method using inverse kinematics are combined.

According to the image processing apparatus of the above embodiments, since data are divided between basic action data obtained by expressing three-dimensional joint angles in the form of functions and additional action data that can be added to the basic action data, not only the amount of action data and the amount of computation can be reduced but also a variety of action data can be generated to match the situation.

While there has been described what is at present considered to be preferred embodiment of the invention, it will be understood that various modifications may be made therein, and it is intended to cover in the appended claims all such modifications as fall within the true spirit and scope of the invention.

What is claimed is:

1. An image processing apparatus for use with an object having a plurality of joints, comprising:

three-dimensional joint position storing means for storing a three-dimensional coordinate position for at least one of said plurality of joints for each frame of a standard action;

geometric data storing means for storing geometric data for at least a portion of said object based on a respective plurality of unique coordinate systems for said at least one of said plurality of joints;

unique coordinate system determining means for determining the unique coordinate system for said at least one of said plurality of joints on the basis of only the three-dimensional coordinate position of said at least one of said plurality of joints;

three-dimensional joint angle computing means for computing a three-dimensional joint angle for said at least one of said plurality of joints in accordance with a desired mode of action modification and on the basis of the unique coordinate system based on only the three-dimensional coordinate position of said at least one of said plurality of joints;

joint angle displacing means for displacing the respective three-dimensional joint angle for said at least one of said plurality of joints in accordance with said desired mode of action modification and on the basis of said respective three-dimensional joint angle;

unique coordinate system generating means for generating the unique coordinate system for said at least one of said plurality of joints in accordance with said desired mode of action modification and on the basis of the three-dimensional joint angles; and action synthesizing means for assigning said geometric data corresponding to said at least one of said plurality of joints in accordance with said desired mode of action modification and on the basis of the unique coordinate systems;

wherein said joint angle displacing means comprises discrete cosine transform means for applying discrete cosine transform to the three-dimensional joint angle for each of all or part of said available joints, and for outputting DCT coefficients, transform coefficient displacing means for displacing a designated element or designated elements included in each of said DCT coefficients, and inverse discrete cosine transform means for applying inverse discrete cosine transform to said DCT coefficients output by said discrete cosine transform means or said DCT coefficients displaced by said transform coefficient displacing means.

2. An image processing apparatus according to claim 1, wherein said designated element is energy of frequency components or selected order, or said designated elements are energy of frequency components and selected order.

3. An image processing apparatus according to claim 1, wherein said inverse discrete cosine transform means limits said DCT coefficients or said displaced DCT coefficients to which the inverse discrete cosine transform is applied.

4. An image processing apparatus for use with an object having a plurality of joints, comprising:

unique coordinate system storing means for storing a three-dimensional coordinate position for each of available joints for each frame of a standard action consisting of one or more cycles of said prescribed action, said available joints being all or part of said plurality of joints;

geometric data storing means for storing geometric data for at least a portion of said object based on a respective plurality of unique coordinate systems for each of said available joints, each of said unique coordinate systems being a three-dimensional coordinate system unique to said available joint, said geometric data based upon only the three-dimensional coordinate positions of said plurality of joints;

three-dimensional joint angle computing means for computing a three-dimensional joint angle for at least one of said available joints in accordance with a desired mode of action modification and on the basis of the unique coordinate systems determined by said unique coordinate system determining means, said three-dimensional joint angle being a three-dimensional angle between the unique coordinate system and the unique coordinate system adjacent to thereto;

joint angle displacing means for displacing the three-dimensional joint angle for at least one of said available joints in accordance with said desired mode of action modification and on the basis of three-dimensional joint angles computed by said three-dimensional joint angle computing means;

unique coordinate system generating means for generating the unique coordinate system for at least one of said available joints in accordance with said desired mode of action modification and on the basis of the three-dimensional joint angles computed by i) at least one of said three-dimensional joint angle computing means and ii) the three-dimensional joint angles displaced by said joint angle displacing means; and action synthesizing means for assigning said geometric data corresponding to each of said available joints in accordance with said desired mode of action modification and on the basis of the unique coordinate systems determined by at least one of i) said unique coordinate system determining means and ii) the unique coordinate systems generated by said unique coordinate system generating means;

wherein said joint angle displacing means comprises discrete cosine transform means for applying discrete cosine transform to the three-dimensional joint angle for each of all or part of said available joints, and for outputting DCT coefficients, transform coefficient displacing means for displacing a designated element or designated elements included in each of said DCT coefficients, and inverse discrete cosine transform means for applying inverse discrete cosine transform to said DCT coefficients output by said discrete cosine transform means or said DCT coefficients displaced by said transform coefficient displacing means.

5. An image processing apparatus according to claim 4, wherein said designated element is energy of frequency components or selected order, or said designated elements are energy of frequency components and selected order.

6. An image processing apparatus according to claim 4, wherein said inverse discrete cosine transform means limits said DCT coefficients or said displaced DCT coefficients to which the inverse discrete cosine transform is applied.

7. An image processing apparatus for use with an object having a plurality of joints, comprising:

three-dimensional joint angle storing means for storing a three-dimensional joint angle for each of available joints for each frame of a standard action consisting of one or more cycles of said prescribed action, said available joints being all or part of said plurality of joints, said three-dimensional joint angle being a three-dimensional angle between the unique coordinate system and the unique coordinate system adjacent to thereto, said unique coordinate system being a tree-dimensional coordinate system unique to said available joint, said three-dimensional joint angle based upon only the three-dimensional coordinate positions of said plurality of joints;

geometric data storing means for storing geometric data for at least a portion of said object based on a respective plurality of unique coordinate systems for each of said available joints;

unique coordinate system determining means for determining the unique coordinate system for each of said available joints on the basis of the unique coordinate system of a root joint and the three-dimensional joint angles, stored in said three-dimensional joint angle storing means said root joint being a root of said available joints;

joint angle displacing means for displacing the three-dimensional joint angle for at least one of said available joints in accordance with said desired mode of action modification and on the basis of the tree-dimensional joint angles stored in said three-dimensional joint angle storing means;

unique coordinate system generating means for generating the unique coordinate system for at least one of said available joints in accordance with said desired mode of action modification and on the basis of at least one of i) the three-dimensional joint angles stored in said three-dimensional joint angle storing means and ii) the three-dimensional joint angles displaced by said joint angle displacing means; and action synthesizing means for assigning said geometric data corresponding to each of said available joints in accordance with said desired mode of action modification and on the basis of the unique coordinate systems determined by at least one of i) said unique coordinate system determining means and ii) the unique coordinate systems generated by said unique coordinate system generating means;

wherein said joint angle displacing means comprises discrete cosine transform means for applying discrete cosine transform to the three-dimensional joint angle for each of all or part of said available joints, and for outputting DCT coefficients, transform coefficient displacing means for displacing a designated element or designated elements included in each of said DCT coefficients, and inverse discrete cosine transform means for applying inverse discrete cosine transform to said DCT coefficients output by said discrete cosine transform means or said DCT coefficients displaced by said transform coefficient displacing means.

8. An image processing apparatus according to claim 7, wherein said designated element is energy of frequency components or selected order, or said designated elements are energy of frequency components and selected order.

9. An image processing apparatus according to claim 7, wherein said inverse discrete cosine transform means limits said DCT coefficients or said displaced DCT coefficients to which the inverse discrete cosine transform is applied.

10. An image processing apparatus for use with an object having a plurality of joints, comprising:

three-dimensional joint position storing means for storing a three-dimensional coordinate position for at least one of said plurality of joints for each frame of a standard action;

geometric data storing means for storing geometric data for at least a portion of said object based on a respective plurality of unique coordinate systems for said at least one of said plurality of joints;

unique coordinate system determining means for determining the unique coordinate system for said at least one of said plurality of joints on the basis of only the three-dimensional coordinate position of said at least one of said plurality of joints;

three-dimensional joint angle computing means for computing a three-dimensional joint angle for said at least one of said plurality of joints in accordance with a desired mode of action modification and on the basis of the unique coordinate system based on only the three-dimensional coordinate position of said at least one of said plurality of joints;

joint angle displacing means for displacing the respective three-dimensional joint angle for said at least one of said plurality of joints in accordance with said desired mode of action modification and on the basis of said respective three-dimensional joint angle;

unique coordinate system generating means for generating the unique coordinate system for said at least one of said plurality of joints in accordance with said desired mode of action modification and on the basis of the three-dimensional joint angles; and action synthesizing means for assigning said geometric data corresponding to said at least one of said plurality of joints in accordance with said desired mode of action modification and on the basis of the unique coordinate systems;

wherein the three-dimensional joint angle is displaced using a discrete cosine transform of the respective three-dimensional joint angle.

11. A method for processing an image of an object having a plurality of joints, the method comprising the steps of:

(a) storing a three-dimensional coordinate position for at least one of said plurality of joints for each frame of a standard action;

(b) storing geometric data for at least a portion of said object based t on a respective plurality of unique coordinate systems for said at least one of said plurality of joints;

(c) determining the unique coordinate system for said at least one of said plurality of joints on the basis of only the three-dimensional coordinate position of said at least one of said plurality of joints;

(d) computing a three-dimensional joint angle for said at least one of said plurality of joints in accordance with a desired mode of action modification and on the basis of the unique coordinate system based on only the three-dimensional coordinate position of said at least one of said plurality of joints;

(e) displacing the respective three-dimensional joint angle for said at least one of said plurality of joints in accordance with said desired mode of action modification and on the basis of said respective three-dimensional joint angle i) applying a discrete cosine transform to said three dimensional joint angle for at least one of said available joints for producing discrete cosine transform coefficients, ii) displacing at least one element of said discrete cosine transform coefficients, and iii) applying an inverse discrete cosine transform to one of said discrete cosine transform and said displaced coefficients;

(f) generating the unique coordinate system for said at least one of said plurality of joints in accordance with said desired mode of action modification and on the basis of the three-dimensional joint angles; and (g) assigning said geometric data corresponding to said at least one said plurality of joints in accordance with said desired mode of action modification and on the basis of the unique coordinate systems.

12. A method for processing an image according to claim 11, wherein said discrete cosine transform treats said three-dimensional joint angle computed in said Step (d) as time series data.

13. An image processing apparatus according to claim 11, in which step (e)(ii) includes displacing at least one element of energy of frequency components and selected order.

14. An image processing apparatus according to claim 11, in which step (e)(iii) includes limiting at least one of said discrete and displaced cosine transform coefficients.

15. An image processing apparatus for use with an object having a plurality of joints, comprising:

three-dimensional joint position storing means for storing a three-dimensional coordinate position for at least one of said plurality of joints for each frame of a standard action;

geometric data storing means for storing geometric data for at least a portion of said object based on a respective plurality of unique coordinate systems for said at least one of said plurality of joints;

unique coordinate system determining means for determining the unique coordinate system for said at least one of said plurality of joints on the basis of only the three-dimensional coordinate position of said at least one of said plurality of joins;

three-dimensional joint angle computing means for computing a three-dimensional joint angle for said at least one of said plurality of joints in accordance with a desired mode of action modification and on the basis of the unique coordinate system based on only the three-dimensional coordinate position of said at least one of said plurality of joints;

joint angle displacing means for displacing the respective three-dimensional joint angle for said at least one of said plurality of joints in accordance with said desired mode of action modification and on the basis of said respective three-dimensional joint angle, said joint angle displacing means comprising (1) means for applying a discrete cosine transform to said three dimensional joint angle for at least one of said available joints for producing discrete cosine transform coefficients, and (2) means for displacing at least one element of said discrete cosine transform coefficients, and applying inverse discrete cosine transform to one of said discrete and displaced cosine transform coefficients;

unique coordinate system generating means for generating the unique coordinate system for said at least one of said plurality of joints in accordance with said desired mode of action modification and on the basis of the three-dimensional joint angles; and action synthesizing means for assigning said geometric data corresponding to said at least one of said plurality of joints in accordance with said desired mode of action modification and on the basis of the unique coordinate systems.

16. An image processing apparatus according to claim 15, wherein said at least one element displaced is at least one element of energy of frequency components and selected order.

17. An image processing apparatus according to claim 15, wherein applying said inverse discrete cosine transform limits at least one of said discrete and displaced cosine transform coefficients.

* * * * *

UNITED STATES PATENT AND TRADEMARK OFFICE
CERTIFICATE OF CORRECTION

PATENT NO. : 6,166,746
DATED : December 26, 2000
INVENTOR(S) : Inada et al.

Page 1 of 1

It is certified that error appears in the above-identified patent and that said Letters Patent is hereby corrected as shown below:

<u>Column 26,</u>
Lines 59-60, "tree-dimensional" should read -- three-dimensional --.

<u>Column 28,</u>
Line 35, after "based" delete "t".

Signed and Sealed this

Twenty-seventh Day of November, 2001

Attest:

NICHOLAS P. GODICI
*Attesting Officer*     *Acting Director of the United States Patent and Trademark Office*